United States Patent
Papasakellariou et al.

(10) Patent No.: US 9,973,303 B2
(45) Date of Patent: May 15, 2018

(54) DETERMINING TIMING FOR TRANSMISSION OR RECEPTION OF SIGNALING IN A COVERAGE ENHANCED OPERATING MODE

(71) Applicant: Samsung Electronics Co., Ltd., Suwon-si, Gyeonggi-do (KR)

(72) Inventors: Aris Papasakellariou, Houston, TX (US); Ying Li, Richardson, TX (US); Boon Loong Ng, Dallas, TX (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 125 days.

(21) Appl. No.: 14/577,433

(22) Filed: Dec. 19, 2014

(65) Prior Publication Data

US 2015/0181576 A1    Jun. 25, 2015

Related U.S. Application Data

(60) Provisional application No. 61/919,261, filed on Dec. 20, 2013.

(51) Int. Cl.
*H04L 1/00* (2006.01)
*H04L 1/08* (2006.01)
(Continued)

(52) U.S. Cl.
CPC .............. *H04L 1/0072* (2013.01); *H04L 1/08* (2013.01); *H04L 5/0053* (2013.01);
(Continued)

(58) Field of Classification Search
CPC ........ H04L 1/0072; H04L 1/08; H04L 5/0053
See application file for complete search history.

(56) References Cited

U.S. PATENT DOCUMENTS

2013/0039824 A1    2/2013  Abu-Sharkh
2013/0294368 A1    11/2013  Bendlin et al.

FOREIGN PATENT DOCUMENTS

| EP | 2557710 A2 | 2/2013 | |
| KR | 10 2009 0102272 A | 9/2009 | |
| WO | WO2007112761 A1 * | 11/2007 | ............... H04B 7/26 |

OTHER PUBLICATIONS

3GPP TSG RAN WG1 Meeting #74bis; "Discussion on Control Channel Coverage Improvement"; R-1-134305; Guangzhou, China; Oct. 7-11, 2013; 6 pages.

(Continued)

*Primary Examiner* — Chandrahas B Patel

(57) ABSTRACT

Methods and apparatus are provided for a base station to transmit and for a User Equipment (UE) to receive repetitions of an enhanced physical downlink control channel (EPDCCH) transmission or of a physical downlink shared channel (PDSCH) transmission. The UE is configured by the base station a set of numbers of repetitions for an EPDCCH transmission or a PDSCH transmission, respectively. The base station transmits an EPDCCH or a PDSCH according to a first number of repetitions from the set of numbers of repetitions. The UE determines a number, from the set of numbers, of repetitions for an EPDCCH reception in order to determine a first subframe for a reception of a PDSCH or a first subframe for a transmission of a physical uplink shared channel (PUSCH).

20 Claims, 13 Drawing Sheets

(51) Int. Cl.
*H04L 5/00* (2006.01)
*H04W 72/12* (2009.01)
(52) U.S. Cl.
CPC .......... *H04L 1/0061* (2013.01); *H04L 5/0044* (2013.01); *H04W 72/12* (2013.01)

(56) References Cited

OTHER PUBLICATIONS

Int'l Search Report of the International Searching Authority, dated Mar. 9, 2015, in connection with Int'l Application No. PCT/KR2014/012618, 6 pages.
Written Opinion of the Int'l Searching Authority dated Mar. 9, 2015 in connection with Int'l Application No. PCT/KR2014/012618, 3 pages.
Communication from a foreign patent office in a counterpart foreign application, "Supplementary European Search Report," Application No. EP 14 87 2904, dated Nov. 7, 2017, 9 pages.
Alcatel-Lucent, et al., "Considerations for (E)PDCCH in coverage enhancement," R1-135156, 3GPP TSG-RAN WG1 Meeting #75, San Francisco, USA, Nov. 11-15, 2013, 4 pages.
Intel Corporation, "Coverage enhancement for PRACH for low cost MTC," R1-135104, 3GPP TSG RAN WG1 Meeting #75, San Francisco, USA, Nov. 11-15, 2013, 8 pages.
Intel Corporation, "Coverage enhancement of DL/UL control channels for low cost MTC," R1-135105, 3GPP TSG-RAN WG1 #75, San Francisco, USA, Nov. 11-15, 2013, 10 pages.

\* cited by examiner

DETERMINING TIMING FOR TRANSMISSION OR RECEPTION OF SIGNALING IN A COVERAGE ENHANCED OPERATING MODE

CROSS-REFERENCE TO RELATED APPLICATION AND CLAIM OF PRIORITY

The present application claims priority under 35 U.S.C. § 119(e) to: U.S. Provisional Patent Application Ser. No. 61/919,261 filed Dec. 20, 2013, entitled "REPETITIONS OF DOWNLINK CONTROL CHANNEL TRANSMISSIONS." The contents of the above-identified patent document are incorporated herein by reference.

TECHNICAL FIELD

The present application relates generally to wireless communications and, more specifically, to repetitions of control channels or data channels for coverage enhancements.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus for control and data signaling to support communication with coverage enhancements.

In a first embodiment, a method is provided. The method includes configuring, by a base station to a User Equipment (UE), a set of numbers of repetitions for an Enhanced Downlink Control CHannel (EPDCCH) transmission in respective set of numbers of subframes. The EPDCCH conveys a Downlink Control Information (DCI) format. The method additionally includes mapping, by the base station, repetitions of an EPDCCH transmission to resource elements according to a first number of repetitions from the set of numbers for repetitions. The method also includes transmitting, by the base station to the UE, repetitions of the EPDCCH.

In a second embodiment, a User Equipment (UE) is provided. The UE includes a receiver, a de-mapper, and a decoder. The receiver is configured to receive a configuration for a set of numbers of repetitions for an Enhanced Downlink Control CHannel (EPDCCH) transmission in a respective set of numbers of subframes. The EPDCCH conveys a Downlink Control Information (DCI) format. The receiver is additionally configured to receive repetitions of an EPDCCH. The de-mapper is configured to de-map the EPDCCH repetitions in resource elements according to one or more numbers of repetitions from the set of numbers for repetitions in respective one or more numbers of subframes from the set of numbers of subframes. The decoder is configured to decode the DCI format.

In a third embodiment, a base station is provided. The base station includes a transmitter and a mapper. The transmitter configured to transmit to a User Equipment (UE) a configuration for a set of numbers of repetitions for an Enhanced Downlink Control CHannel (EPDCCH) transmission in respective set of numbers of subframes. The EPDCCH conveys a Downlink Control Information (DCI) format. The transmitted is additionally configured to transmit repetitions of an EPDCCH. The mapper is configured to map repetitions of an EPDCCH transmission to resource elements according to a first number of repetitions from the set of numbers of repetitions.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v11.2.0, "E-UTRA, Physical channels and modulation" (REF 1); 3GPP TS 36.212 v11.2.0, "E-UTRA, Multiplexing and Channel coding" (REF 2); 3GPP TS 36.213 v11.2.0, "E-UTRA, Physical Layer Procedures" (REF 3); 3GPP TS 36.321 v11.2.0, "E-UTRA, Medium Access Control (MAC) protocol specification" (REF 4); and 3GPP TS 36.331 v11.2.0, "E-UTRA, Radio Resource Control (RRC) Protocol Specification" (REF 5).

Embodiments of the present disclosure relate to repetitions of control or data channels to support communication with coverage enhancements. A wireless communication network includes a DownLink (DL) that conveys signals from transmission points, such as base stations or enhanced NodeBs (eNBs), to UEs. The wireless communication network also includes an UpLink (UL) that conveys signals from UEs to reception points, such as eNBs.

Figure 1:
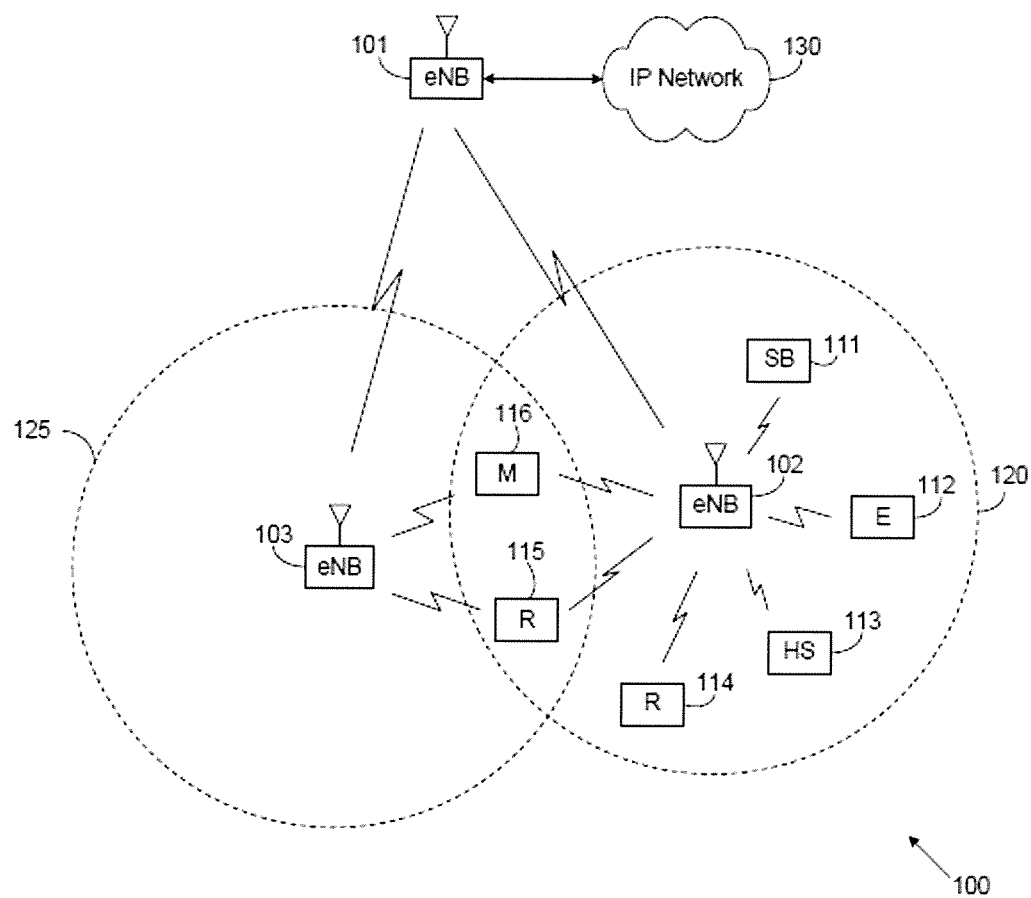
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." A UE, may be fixed or mobile and may be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100. The eNBs 101-103 can provide coverage enhancements for control or data channels. One or more of the eNBs 101-103 are configured to support operations for determining timing for transmission or reception of signaling in a coverage enhanced mode.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
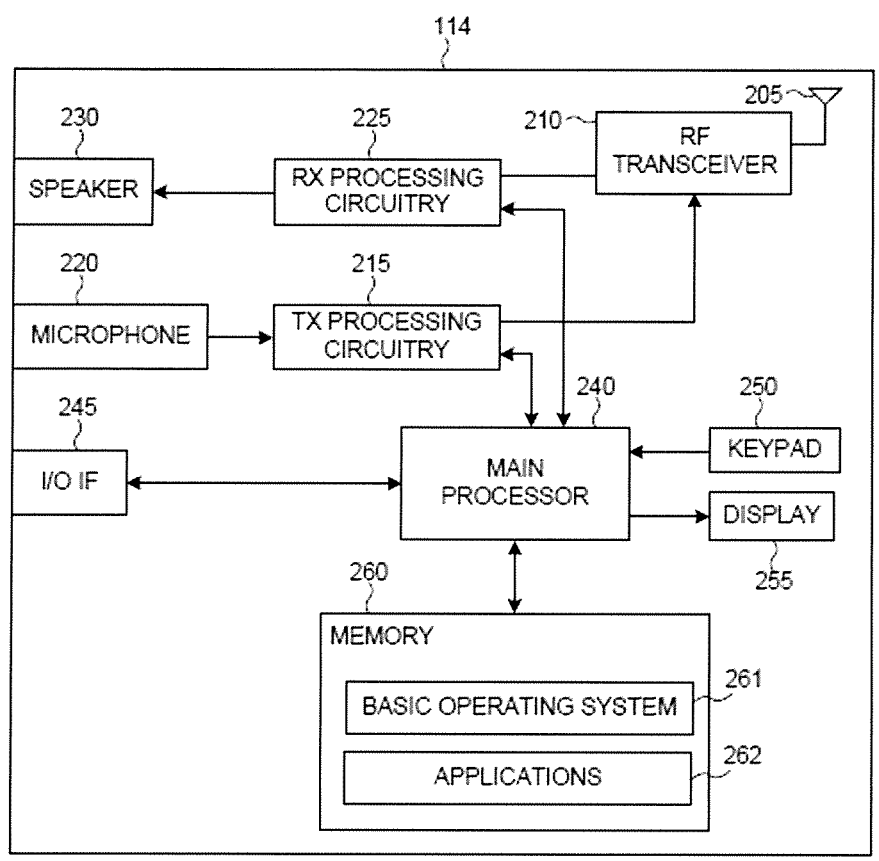
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260, such as operations in support of operations for determining timing for transmission or reception of signaling in a coverage enhanced mode. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touch-screen.

The memory 260 is coupled to the main processor 240. Part of the memory 260 could include a control or data signaling memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support transmission and/or reception of control or data channels in a normal mode or in an enhanced coverage mode.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
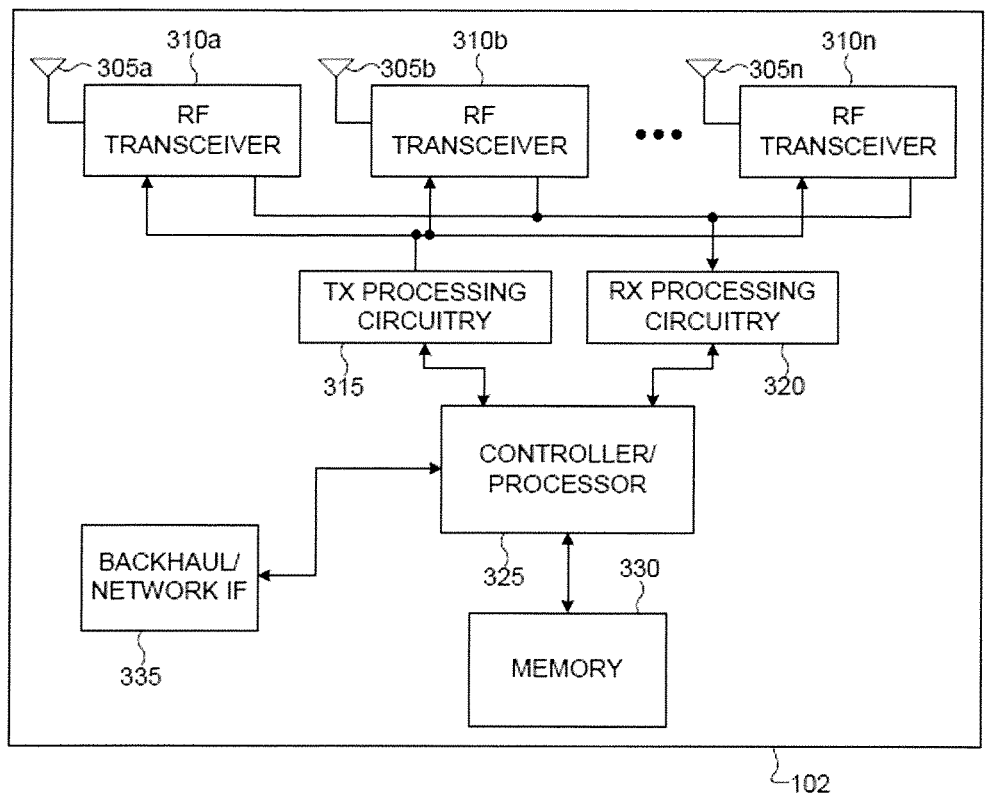
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS and operations to support determining timing for transmission or reception of signaling in a coverage enhanced mode. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support transmission and/or reception of control or data channels in a normal mode or in an enhanced coverage mode.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals include data signals conveying information content, control signals conveying DL Control Information (DCI), and Reference Signals (RS), which are also known as pilot signals. An eNB, such as eNB 012, can transmit DL signals using Orthogonal Frequency Division Multiplexing (OFDM). The eNB 102 can transmit data information through Physical DL Shared CHannels (PDSCHs). The eNB 102 can transmit DCI through Physical DL Control CHannels (PDCCHs) or through Enhanced PDCCHs (EPDCCHs)—see also REF 1. The eNB 102 can transmit one or more of multiple types of RS, including a UE-Common RS (CRS), a Channel State Information RS (CSI-RS), and a DeModulation RS (DMRS)—see also REF 1. A CRS can be transmitted over a DL system BandWidth (BW) and can be used by UEs, such as UE 114, to demodulate data or control signals or to perform measurements. To reduce CRS overhead, the eNB 102 can transmit a CSI-RS with a smaller density in the time or frequency domain than a CRS. For Interference Measurements (IMs), CSI-IM resources associated with a Zero Power CSI-RS (ZP CSI-RS) can be used. The UE 114 can determine CSI-RS transmission parameters through higher-layer signaling, such as Radio Resource Control (RRC) signaling (see also REF 5) from eNB 102. DMRS is transmitted only in the BW of a respective PDSCH or EPDCCH, and the UE 114 can use the DMRS to demodulate information in a PDSCH or EPDCCH. A PDSCH or EPDCCH transmission can be in a DL Sub-Frame (SF). A SF is part of a frame that includes ten SFs. A frame is identified by a System Frame Number ranging from 0 to 1023 (and can be represented by 10 binary elements). A SF includes two slots.

Figure 4:
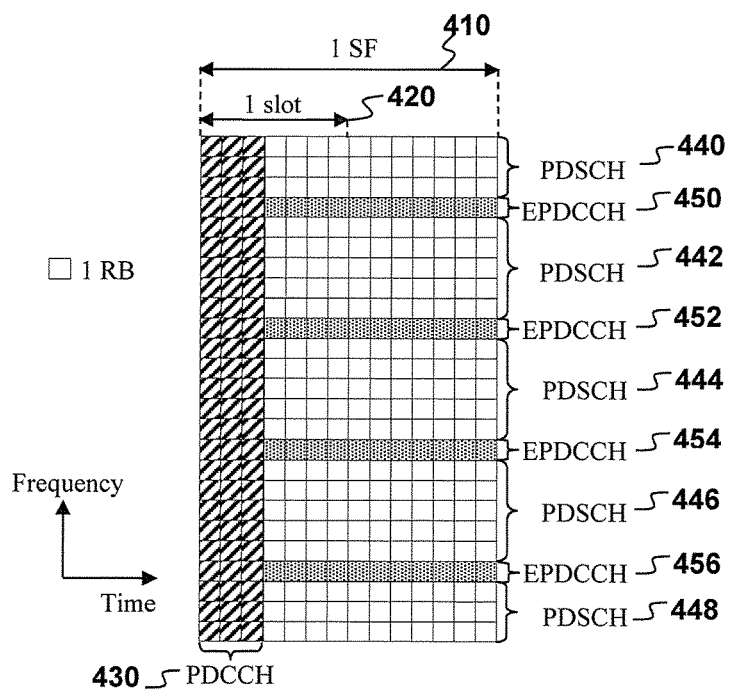
FIG. 4 illustrates an example structure for a DL SF according to this disclosure.

FIG. 4 illustrates an example structure for a DL SF according to this disclosure. The embodiment of the DL SF structure shown in FIG. 4 is for illustration only. Other embodiments could be used without departing from the scope of the present disclosure.

A DL SF 410 includes two slots 420 and a total of $N_{symb}^{DL}$ symbols for transmitting of data information and DCI. The first $M_{symb}^{DL}$ SF symbols are used for eNB 102 to transmit PDCCHs and other control channels (not shown) 430. The remaining $N_{symb}^{DL}-M_{symb}^{DL}$ SF symbols are primarily used for eNB 102 to transmit PDSCHs 440, 442, 444, 446, and 448 or EPDCCHs 450, 452, 454, and 456. A transmission BW consists of frequency resource units referred to as Resource Blocks (RBs). Each RB consists of $N_{sc}^{RB}$ sub-carriers, or Resource Elements (REs). UE 114 can be allocated $M_{PDSCH}$ RBs for a total of $M_{sc}^{PDSCH}=M_{PDSCH} \cdot N_{sc}^{RB}$ REs for the PDSCH transmission BW. An EPDCCH transmission can be located in one RB or in multiple of RBs.

UL signals also include data signals conveying information content, control signals conveying UL Control Information (UCI), and RS. UE 114 transmits data information or UCI through a respective Physical UL Shared CHannel (PUSCH) or a Physical UL Control CHannel (PUCCH). If UE 114 simultaneously transmits data information and UCI, UE 114 can multiplex both the data information and UCI in a PUSCH. The UCI includes Hybrid Automatic Repeat reQuest ACKnowledgement (HARQ-ACK) information, indicating correct or incorrect detection of data Transport Blocks (TBs) in a PDSCH, Scheduling Request (SR) indicating whether a UE has data in its buffer, and Channel State Information (CSI) enabling the eNB 102 to select appropriate parameters for PDSCH transmissions to UE 114. The HARQ-ACK information includes a positive ACKnowledgement (ACK) in response to a correct (E)PDCCH or data TB detection, a Negative ACKnowledgement (NACK) in response to an incorrect data TB detection, and an absence of a (E)PDCCH detection (DTX) that can be implicit (that is, UE 114 does not transmit a HARQ-ACK signal) or explicit if UE 114 can identify missed (E)PDCCHs by other means (it is also possible to represent NACK and DTX with a same NACK/DTX state). The UL RS includes DMRS and Sounding RS (SRS)—see also REF 1. The UE 114 transmits DMRS only in a BW of a respective PUSCH or PUCCH and eNB 102 can use a DMRS to demodulate information in a PUSCH or PUCCH.

DCI can serve several purposes (see also REF 2). A DCI format in a respective (E)PDCCH can schedule a PDSCH or a PUSCH transmission conveying data information to or from UE 114, respectively. The UE 114 monitors a DCI format 1A for PDSCH scheduling and a DCI format 0 for PUSCH scheduling. These two DCI formats are designed to always have a same size and are jointly referred to as DCI Format 0/1A. Another DCI format, DCI format 1C, in a respective (E)PDCCH can schedule a PDSCH providing System Information (SI) to a group of UEs for network configuration parameters, or a response to a Random Access (RA) by UEs, or paging information to a group of UEs, and so forth. Another DCI format, DCI format 3 or DCI format 3A (jointly referred to as DCI format 3/3A) can provide to a group of UEs Transmission Power Control (TPC) commands for transmissions of respective PUSCHs or PUCCHs.

A DCI format includes Cyclic Redundancy Check (CRC) bits in order for UE 114 to confirm a correct detection. A DCI format type is identified by a Radio Network Temporary Identifier (RNTI) that scrambles the CRC bits. For a DCI format scheduling a PDSCH or a PUSCH only to UE 114 (unicast scheduling), the RNTI is a Cell RNTI (C-RNTI). For Semi-Persistent Scheduling (SPS) PDSCH or PUSCH scheduling, the RNTI is an SPS-RNTI. For a DCI format scheduling a PDSCH conveying SI to a group of UEs (broadcast scheduling), the RNTI is a SI-RNTI. For a DCI format scheduling a PDSCH providing a response to a RA from a group of UEs, the RNTI is a RA-RNTI. For a DCI format scheduling a PDSCH paging a group of UEs, the RNTI is a P-RNTI. For a DCI format providing TPC commands to a group of UEs, the RNTI is a TPC-RNTI. Each RNTI type is configured to a UE through higher layer signaling (and the C-RNTI is unique for each UE).

The eNB 102 separately codes and transmits a DCI format to UE 114 in a respective EPDCCH. To avoid an EPDCCH transmission to UE 114 blocking an EPDCCH transmission to another UE, such as UE 115, a location of each EPDCCH transmission in the time-frequency domain of a DL control region is not unique and, as a consequence, UE 114 needs to perform multiple decoding operations to determine whether there is an EPDCCH intended for it according to an EPDCCH search space (see also REF 3). REs carrying an EPDCCH are grouped into Enhanced Control Channel Elements (ECCEs) in the logical domain. For a given number of DCI format bits, a number of ECCEs for a respective EPDCCH depends on a channel coding rate (Quadrature Phase Shift Keying (QPSK) is assumed as the modulation scheme) required to achieve a desired EPDCCH detection reliability such as a desired BLock Error Rate (BLER). The eNB 102 can use a lower channel coding rate (more ECCEs) for EPDCCH transmissions to UEs experiencing low DL Signal-to-Interference and Noise Ratio (SINR) than to UEs experiencing a high DL SINR. ECCE aggregation levels can consist, for example of 1, 2, 4, 8, 16, and possibly 32 ECCEs depending upon a size of a RB set assigned to a UE for EPDCCH reception (see also REF 3).

For an EPDCCH decoding process, UE 114 determines a search space for candidate EPDCCH transmissions in a DL control region after it restores ECCEs in the logical domain according to a UE-common set of ECCEs, if any, (Common Search Space or CSS) and according to a UE-dedicated set of ECCEs (UE-Dedicated Search Space or UE-DSS). A CSS can be used to transmit DCI formats associated with UE-common control information and use a SI-RNTI, a P-RNTI, a TPC-RNTI, and so forth, to scramble respective CRCs. A UE-DSS can used to transmit DCI formats associated with UE-specific control information and use respective C-RNTIs or SPS-C-RNTIs to scramble respective CRCs. EPDCCHs conveying DCI Formats 0/1A can be transmitted in both a CSS and a UE-DSS.

Figure 5:
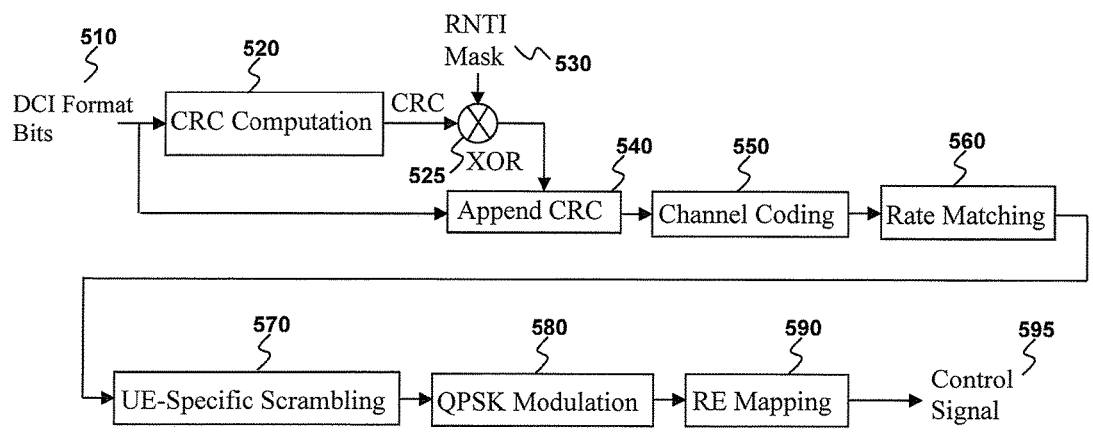
FIG. 5 illustrates an example encoding process for a DCI format according to this disclosure.

FIG. 5 illustrates an example encoding process for a DCI format according to this disclosure. The embodiment of the encoding process shown in FIG. 5 is for illustration only. Other embodiments could be used without departing from the scope of the present disclosure.

The eNB 102 separately codes and transmits each DCI format in a respective EPDCCH. A RNTI for UE 114, for which a DCI format is intended for, masks a CRC of a DCI format codeword in order to enable UE 114 to identify that a particular DCI format is intended for UE 114. The CRC of (non-coded) DCI format bits 510 is computed using a CRC computation operation 520, and the CRC is then masked using an exclusive OR (XOR) operation 525 between CRC and RNTI bits 530 (see also REF 2). The XOR operation 525 is defined as: XOR(0,0)=0, XOR(0,1)=1, XOR(1,0)=1, XOR(1,1)=0. The masked CRC bits are appended to DCI format information bits using a CRC append operation 540, channel coding is performed using a channel coding operation 550 (such as an operation using a convolutional code with tail biting), followed by rate matching 560, scrambling with a UE-specific scrambling sequence 570 (another XOR operation), modulation 580 using for example QPSK, and the modulated symbols of the encoded DCI format are mapped to REs 590 (see also REF 1), and the output control signal 595 is transmitted in an EPDCCH. In the present example, both a CRC and a RNTI include 16 bits.

Figure 6:
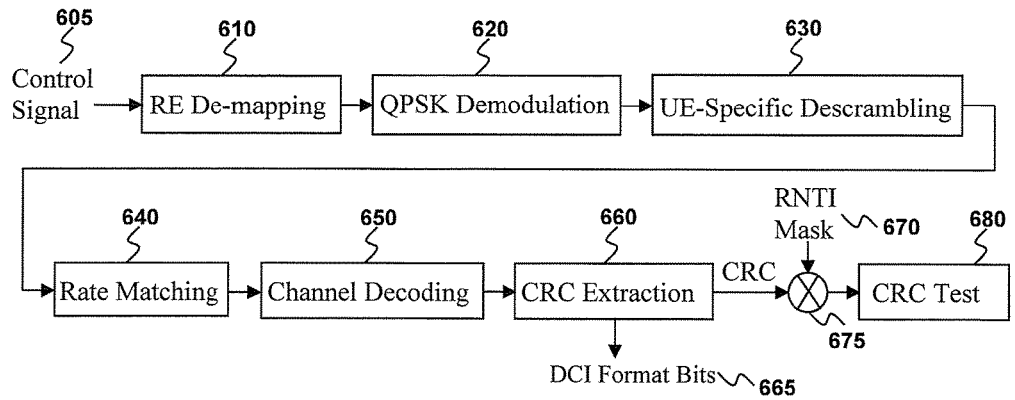
FIG. 6 illustrates an example decoding process for a DCI format according to this disclosure.

FIG. 6 illustrates an example decoding process for a DCI format according to this disclosure. The embodiment of the decoding process shown in FIG. 6 is for illustration only. Other embodiments could be used without departing from the scope of the present disclosure.

UE 114 receives REs for a control signal 605 in an EPDCCH, de-maps the REs 610 according to a search space for ECCE locations of an EPDCCH candidate, and demodulates received symbols of a presumed DCI format 620. The demodulated symbols are subsequently descrambled by applying an XOR operation with a complex conjugate of a UE-specific scrambling sequence 630. A rate matching applied at eNB 102 transmitter is restored 640 followed by channel decoding such as convolutional decoding 650. After decoding, UE 114 obtains DCI format bits 665 after extracting CRC bits 660 that are then de-masked 670 by applying the XOR operation with a RNTI associated with the DCI format 670. Finally, UE 114 performs a CRC check 680. If the CRC check is positive and the contents of the DCI format are valid, UE 114 determines that the DCI format is valid and determines parameters for PDSCH reception or PUSCH transmission; otherwise, UE 114 disregards the presumed DCI format.

Low cost UEs, such as Machine-Type Communication (MTC) UEs, typically require low operational power consumption and are expected to communicate with infrequent small burst transmissions. In addition, low cost UEs can be deployed deep inside buildings or, generally, in locations experiencing significantly larger penetration losses than conventional UEs and can require significant coverage enhancements relative to a conventional cell coverage footprint. In extreme coverage scenarios, low cost UEs can have characteristics such as very low data rate, large delay tolerance, and limited mobility, thereby potentially being capable to operate without some messages/channels. Required system functionalities for low cost UEs in an enhanced coverage operating mode can include synchronization, cell search, power control, random access process, channel estimation, measurement reporting, and DL/UL data transmission (including DL/UL resource allocation). Not all low cost UEs require coverage enhancement or require a same amount of coverage enhancement. In addition, in different deployment scenarios, a required coverage enhancement can be different for different eNBs, for example depending on an eNB transmission power or an associated cell size or number of receiver antennas, as well as for different low cost UEs, for example depending on a location of a low cost UE.

A conventional way to support enhanced coverage is to repeat transmissions of signals either in a time domain or in a frequency domain. Therefore, as coverage enhancements for physical channels consume additional resources and power and consequently result to lower spectral efficiency and reduced UE battery life, it is beneficial to enable proper adjustments of resources according to a required coverage enhancement level.

In order to minimize power consumption by a UE operating in a coverage enhanced mode, control or data signaling transmission to such UE can occupy all RBs the UE is capable to receive. For example, for a low cost UE that operates in a coverage enhanced mode and is capable of a maximum reception bandwidth of 6 RBs at a given time instance, an EPDCCH repetition or a PDSCH repetition can occupy all 6 RBs in order to minimize a number of repetitions (subframes) the UE needs to receive in order to detect, respectively, a DCI format or a data transport block.

An eNB, such as eNB 102, cannot know with precise accuracy a coverage enhancement level required for a UE, such as UE 114, and as a power the eNB has available for transmitting EPDCCH repetitions or PDSCH repetitions can vary in time, embodiments of the present disclosure illustrate that it is beneficial to configure the UE to monitor EPDCCH or PDSCH for multiple repetition levels. This can provide flexibility to the eNB to optimize use of power and bandwidth resources and accordingly adjust a number of repetitions for an EPDCCH transmission or for a PDSCH transmission to the UE. Using an adaptive number of repetitions for an EPDCCH transmission, conveying a DCI format that schedules a PDSCH reception to the UE or a PUSCH transmission from the UE, requires means for enabling the eNB and the UE to have a same understanding for a number of repetitions the eNB used to transmit the EPDCCH because, otherwise, the UE may attempt to receive PDSCH or transmit PUSCH in incorrect respective subframes. Similar, using an adaptive number of repetitions for a PDSCH transmission, requires means for enabling the eNB and the UE to have a same understanding for a number of repetitions the eNB used to transmit the PDSCH in order for the UE to transmit HARQ-ACK signaling in response to a PDSCH reception in same subframes as expected by the eNB. Additionally, for a low cost UE that cannot simultaneously receive multiple PDSCHs or transmit multiple PUSCHs, it is beneficial for a network to avoid transmitting EPDCCHs that would lead to such events.

Embodiments of this disclosure enable adaptation for a number of repetitions for an EPDCCH transmission or a PDCCH transmission from an eNB to a UE. Embodiments of this disclosure also provide mechanisms for an eNB to implicitly or explicitly indicate to a UE a number of repetitions, for a set of candidate numbers of repetitions an eNB configures to the UE, for an EPDCCH or PDSCH transmission and for the UE to determine the number of repetitions. Additionally, embodiments of this disclosure provide mechanisms for a UE to determine a first subframe for a reception of a PDSCH or for a transmission of a PUSCH that is scheduled by a DCI format conveyed by an EPDCCH that is transmitted by an eNB using a first number of repetitions when the UE detects the DCI format using a second number of repetitions that is smaller than the first number of repetition. Embodiments of this disclosure further provide mechanisms for a UE to determine a first subframe for a transmission of a HARQ-ACK signal in response to detecting a DCI format in an EPDCCH or a data transport block in a PDSCH scheduled by the DCI format when the EPDCCH or the PDSCH, respectively, are transmitted with repetitions. Embodiments of this disclosure also provide mechanisms for an eNB to transmit and for a UE to receive repetitions of an EPDCCH transmission or a PDSCH transmission using frequency hopping. Additionally, embodiments of this disclosure provide mechanisms for a UE to inform an eNB to adjust a number of repetitions for an EPDCCH or PDSCH transmission to the UE. Embodiments of this disclosure further provide a mapping for a block of DCI format symbols or of data transport block symbols to resource elements of subframes with repetitions of a respective EPDCCH or PDSCH transmission.

The following embodiments are not limited to low cost UEs and can be applicable to any type of UEs requiring an enhancement in coverage beyond a coverage supported by a conventional operation. Moreover, although the descriptions consider SF structures with symbols having a normal Cyclic Prefix (CP), they are also applicable for SF structures with symbols having an extended CP (see also REF 1).

A UE, such as UE 114, can be configured by an eNB, such as eNB 102 using higher layer signaling such as RRC signaling, with multiple numbers of repetitions for an EPDCCH transmission and with multiple numbers of repetitions for a PDSCH transmission. The eNB can choose one of the respective multiple numbers of repetitions to transmit an EPDCCH or a PDSCH to the UE. For example, as the eNB cannot know with precise accuracy a coverage enhancement level required for the UE then, for an estimated coverage enhancement level of 6 dB, the eNB can configure the UE to monitor EPDCCH transmissions having 4 or 8 repetitions (UE decodes EPDCCH candidates for 4 and 8 repetitions). For example, as the eNB may not be able to predict available power for repetitions of an EPDCCH or PDSCH transmission to the UE, the eNB can assume a minimum (worst case) power availability and configure the UE with a maximum number of repetitions for an EPDCCH or PDSCH transmission while, for a particular EPDCCH or PDSCH transmission, the eNB can have a larger available power than the minimum one and can then transmit the EPDCCH or the PDSCH using a smaller number of repetitions than the maximum one.

Embodiments of the present disclosure consider that timing (starting subframe) for a UE to receive a PDSCH or to transmit a PUSCH that is scheduled by a DCI format conveyed by an EPDCCH that is transmitted according to a number of repetitions, from a set of numbers of repetitions the eNB configures to the UE, is either determined from the number of repetitions or is determined by a maximum number of repetitions configured to the UE by the eNB. Embodiments of the present disclosure further consider that timing (starting subframe) for a UE to transmit HARQ-ACK signaling is either determined by a maximum number of PDSCH repetitions configured to the UE by the eNB, or determined by a number of repetitions where eNB transmits the PDSCH according to the number of repetitions, if the number of repetitions is explicitly indicated by a DCI format scheduling the PDSCH or if the UE transmits HARQ-ACK signaling only in case of an ACK for the data transport block conveyed by the PDSCH (and the UE does not transmit HARQ-ACK signaling in case of a NACK for the data transport block conveyed by the PDSCH).

Case 1: The UE determines starting subframe for a PDSCH reception or for a PUSCH transmission based on a number of repetitions, from a set of numbers of repetitions, for an EPDCCH transmission conveying a DCI format scheduling the PDSCH or the PUSCH. The UE determines starting subframe to transmit HARQ-ACK signaling either from a maximum number of PDSCH repetitions configured to the UE by the eNB, or from a number of repetitions, where the eNB transmits the PDSCH according to the number of repetitions, if the number of repetitions is explicitly indicated by a DCI format scheduling the PDSCH or if the UE transmits HARQ-ACK signaling only in case of an ACK for the data transport block conveyed by the PDSCH.

In the following, for two numbers of repetitions of an EPDCCH (or PDSCH) transmission, $N_1$ and $N_2 > N_1$, an eNB transmits an EPDCCH (or PDSCH) according to $N_1$ repetitions if the eNB actually transmits the EPDCCH (or PDSCH) in $N_1$ or less repetitions. The eNB also transmits an EPDCCH (or PDSCH) according to $N_2$ repetitions if the eNB actually transmits the EPDCCH (or PDSCH) in more than $N_1$ but less than or equal to $N_2$ repetitions.

If an eNB, such as eNB 102, configures to a UE, such as UE 114 using for example higher layer signaling such as RRC signaling, a set of numbers of repetitions for an EPDCCH transmission or a set of numbers of repetitions for a PDSCH transmission, the UE determines a number of repetitions, from the set of numbers of repetitions, where the eNB transmitted the EPDCCH or the PDSCH according to the number of repetitions, respectively. The UE determines a starting subframe for a PDSCH reception or a PUSCH transmission scheduled by a DCI format conveyed by the EPDCCH transmission based on the number of repetitions the UE determines for the EPDCCH transmission. The UE determines a starting subframe for a PUCCH transmission for HARQ-ACK signaling in response to the DCI format the UE detects based on the number of repetitions the UE determines for the EPDCCH transmission, in case the DCI format conveys an SPS release, or based on the number of repetitions the UE determines for the PDSCH transmission in case the DCI format schedules a data transport block in the PDSCH; otherwise, if the UE cannot reliably determine the number of repetitions, the UE determines the starting subframe for the PUCCH transmission based on the maximum configured number of PDSCH repetitions (or EPDCCH repetitions in case of SPS release).

An advantage from having multiple numbers of EPDCCH repetitions or PDSCH repetitions configured by the eNB to the UE is that the eNB can adaptively select a number of repetitions for an EPDCCH or a PDSCH transmission to the UE according to a respective available transmission power. For example, if during subframes for repetitions of an EPDCCH transmission the eNB can determine that the eNB will have additional available power in at least some of the subframes, the eNB can increase a transmission power for at least some of the repetitions of the EPDCCH transmission, for example by 3 deciBell (dB), and can use a smaller number of repetitions, for example by a factor of 2 relative to the ones that assume a nominal transmission power (no power increase or decrease), for the EPDCCH transmission. Conversely, if during subframes repetitions of an EPDCCH transmission eNB can determine that it will need additional available power in at least some of the subframes to transmit other signaling, the eNB can increase a transmission power for at least some of the repetitions of the EPDCCH transmission and can use a larger number of repetitions to transmit the EPDCCH. For example, if a power for at least some repetitions of an EPDCCH transmission is reduced by 3 dB, the eNB can use a number of repetitions that is larger by a factor of 2 relative to the number of repetitions corresponding to use of a nominal transmission power.

If the UE is configured by the eNB to detect multiple DCI formats, a first number of EPDCCH repetitions can be configured for a first DCI format size and a second number of EPDCCH repetitions can be configured for a second DCI format size. If the first DCI format size is larger than the second DCI format size, the first number of EPDCCH repetitions is larger than the second number of EPDCCH repetitions.

If the UE determines a starting subframe to receive a PDSCH or to transmit a PUSCH based on a number of repetitions, from the configured set of numbers of repetitions, for an EPDCCH transmission conveying a respective DCI format then, in order to ensure a same understanding between the UE and the eNB for subframes where the eNB transmits PDSCH or the UE transmits PUSCH, it is necessary for the eNB and the UE to have a same understanding for the number of repetitions for the EPDCCH transmission. However, it is possible that the UE can detect the DCI format with a different number of repetitions, either smaller or larger, than the one the eNB considered to transmit the respective EPDCCH.

Several approaches are subsequently disclosed to enable an eNB and a UE to have a same understanding for a number of repetitions, from a set of candidate numbers of repetitions the eNB configures to the UE, for an EPDCCH transmission.

In a first approach, different scrambling sequences (or different initializations or patterns of a same scrambling sequence, effectively resulting to different scrambling sequences) are associated with different candidate numbers of repetitions, from the set of candidate numbers of repetitions, for an EPDCCH transmission. For example, an eNB can use a first scrambling sequence when transmitting to a UE an EPDCCH according to a first number $N_1$ of repetitions and use a second scrambling sequence when transmitting to the UE an EPDCCH according to second number $N_2 > N_1$ of repetitions. For example, the first scrambling sequence for the smallest candidate number of repetitions $N_1$ can be same as the one used to transmit an EPDCCH without repetitions and the second scrambling sequence can be the algebraic opposite of the first sequence at least for the first $N_1$ of the $N_2$ repetitions (each element of the first sequence is multiplied by −1).

The UE can use the first scrambling sequence to decode an EPDCCH candidate associated with $N_1$ repetitions and use the second scrambling sequence to decode an EPDCCH candidate associated with $N_2 > N_1$ repetitions. If the detection of a respective DCI format is successful, the UE can consider that the eNB transmitted the EPDCCH according to a respective number of repetitions and the UE can subsequently receive a PDSCH or transmit a PUSCH in a subframe determined from the number of repetitions for the EPDCCH transmission. For example, the UE can begin PDSCH reception at the first or second subframe after a subframe for the last repetition from the number of repetitions of the EPDCCH transmission or can begin PUSCH transmission at the fourth subframe (for an FDD system) after a subframe for the last repetition from the number of repetitions of the EPDCCH transmission. It is noted that the UE can detect the DCI format using the first or the second scrambling sequence in less than $N_1$ or $N_2$, respectively, repetitions for a respective EPDCCH transmission but determine a timing for a first repetition of a PDSCH or PUSCH transmission based on $N_1$ or $N_2$, respectively. Using different scrambling sequences can also apply in case of respective different repetition numbers for a PDSCH transmission.

Figure 7:
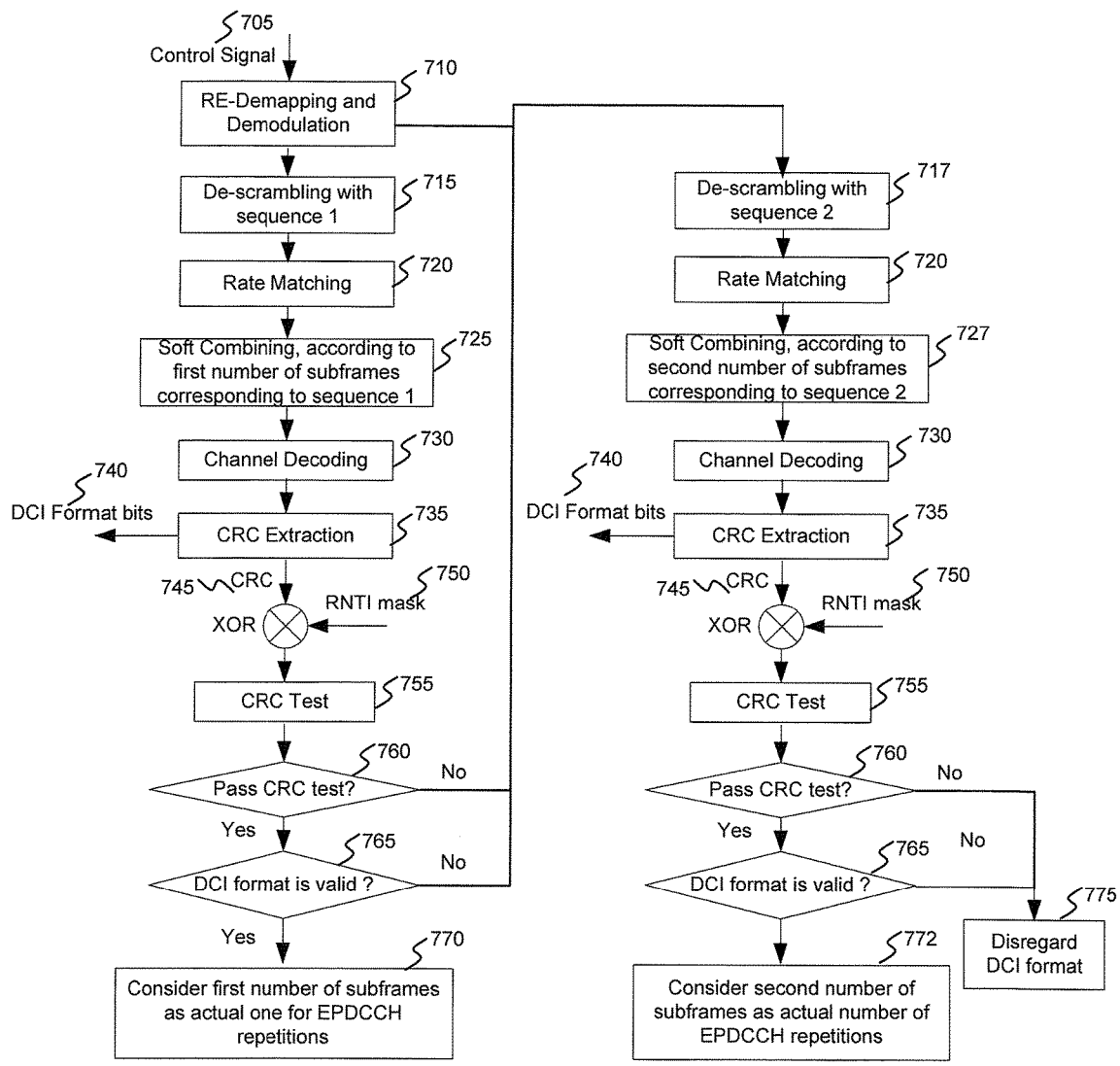
FIG. 7 illustrates an example operation for a UE to detect a DCI format conveyed by an EPDCCH that is transmitted with one of two candidate repetition numbers where a different scrambling sequence is applied to DCI format symbols depending on the candidate number of repetitions according to this disclosure.

FIG. 7 illustrates an example operation for a UE to detect a DCI format conveyed by an EPDCCH that is transmitted with one of two candidate repetition numbers where a different scrambling sequence is applied to DCI format symbols depending on the candidate number of repetitions. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain or processing circuitry in, for example, a UE.

A UE, such as UE 114, receives a control signal in block 705 in an EPDCCH and performs RE-demapping using a demapper and demodulation using a demodulator in block 710. The resulting bits are de-scrambled by a descrambler using a first scrambling sequence (scrambling sequence 1) in block 715. Subsequently, the UE restores, in block 720, a rate matching applied at an eNB transmitter, such as eNB 102, and decodes a presumed DCI format by a decoder, in block 730, after combining in block 725 according to a number of repetitions that is smaller than or equal to the first number of repetitions for the EPDCCH transmission corresponding to the first scrambling sequence for a same DCI format. The order of blocks 710, 715, 720, and 725 can be inter-changed and, for example, block 715 can be placed last. After decoding, the UE separates, in block 735, DCI format information bits in block 740 and CRC bits in block 745, and de-masks CRC bits by applying an XOR operation with a RNTI corresponding to the DCI format the UE attempts to detect in block 750.

Further, the UE performs a CRC test in block 755 and determines in block 760 whether it is a positive one. If the CRC test is positive, the UE determines in block 765 whether the presumed DCI format is valid. For example, if in the DCI format a particular bit value is valid only when '0' but in the presumed DCI format in block 740 it is '1', the UE can consider the presumed DCI format, in block 740, as invalid. If the UE determines the detected DCI format, in block 740, to be valid, the UE considers, in block 770, that the eNB transmitted the EPDCCH according to the first number of repetitions corresponding to the first scrambling sequence; otherwise, the UE can disregard the presumed DCI format in block 740. Otherwise, the UE continues to soft-combine received symbols for the presumed EPDCCH and de-scrambles them in block 717, using a second scrambling sequence (scrambling sequence 2), continues to combine, in block 727, receptions according to a second number of repetitions corresponding to the second scrambling sequence, and performs operations 730 through 765 as they were previously described. If either the CRC test fails or the presumed DCI format is deemed invalid, the UE disregards, in block 775, the presumed DCI format. Otherwise, the UE considers in block 772, that the eNB transmitted the EPDCCH according to the second number of repetitions corresponding to the second scrambling sequence.

Although in FIG. 7 the UE operations for detecting a DCI format associated with the second scrambling sequence follow the ones for the first scrambling sequence (e.g. if the second scrambling sequence is associated with a larger number of repetitions for an EPDCCH transmission and a decoding process for a first, smaller number, of repetitions for an EPDCCH transmission can be completed at an earlier subframe), they can instead be performed in parallel at the expense of additional UE complexity (parallel descrambling and decoding for two hypotheses). Moreover, when the UE detects a DCI format, it determines a first subframe for a respective PDSCH reception or PUSCH transmission from the number of subframes according to the number of repetitions, from the configured set of numbers of repetitions, for the EPDCCH transmission conveying the detected DCI format.

In a second approach, different RNTIs for a DCI format are used for different numbers of repetitions for an EPDCCH transmission. A first RNTI can correspond to a first number of repetitions and a second RNTI can correspond to a second number of repetitions. A UE can use the first RNTI to detect a DCI format according to a first candidate number of repetitions for an EPDCCH transmission and use the second RNTI detect a DCI format according to a second candidate number of repetitions for an EPDCCH transmission. If the DCI format is detected for a RNTI associated with the first or the second candidate number of repetitions, the UE determines a first subframe for a respective PDSCH reception or PUSCH transmission based on a last subframe from the first set of subframes or the second set of subframes corresponding to the first number of repetitions or the second number of repetitions, respectively.

Using a different RNTI can be functionally equivalent to using a same RNTI and applying an additional different mask; for example, assuming that a CRC and a RNTI include 16 bits then, similar to closed loop transmit antenna selection as described in REF 3, the operation for RNTI bits 530 in FIG. 5 can be repeated for a mask of 16 binary '0' (in practice this can be skipped as it does not change a resulting RNTI) to indicate a first number of repetitions and can be repeated for a mask of 15 binary '0' followed by a binary '1' (effectively only the last RNTI bit is changed) to indicate a second number of repetitions. This approach also implies UEs having RNTI with the most significant bit (last bit) being a binary '0'.

Figure 8:
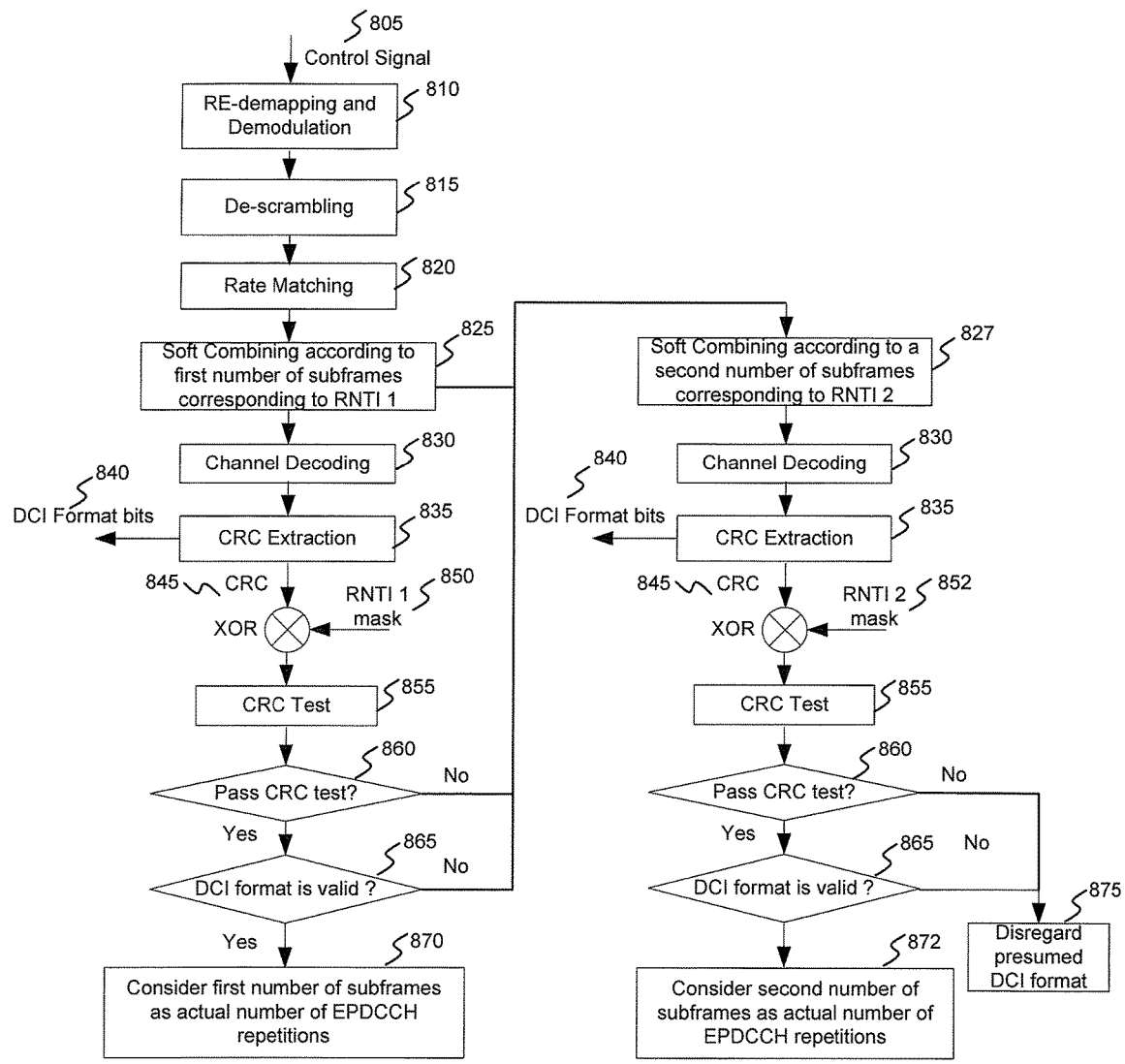
FIG. 8 illustrates an example operation for a UE to decode an EPDCCH transmitted with one of two possible candidate repetition numbers using two RNTIs respectively associated with the two candidate repetition numbers according to this disclosure.

FIG. 8 illustrates an example operation for a UE to decode an EPDCCH transmitted with one of two possible candidate repetition numbers using two RNTIs respectively associated with the two candidate repetition numbers. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain or processing circuitry in, for example, a UE.

Only operations different to the ones in FIG. 7 are described for brevity. That is, operations in blocks 805, 810, 820, 830, 835, 850, 855, 860, 865, 870, 875 of FIG. 8 are the same as, or similar to, respective operations in blocks 705, 710, 720, 730, 735, 750, 755, 760, 765, 770, 775 of FIG. 7. In block 825, the UE combines received signaling according to a first number of repetitions corresponding to a first RNTI (RNTI1) for scrambling a CRC of an associated DCI format transmitted in an EPDCCH. In a CRC de-masking operation, a RNTI1 mask is used in block 850. If either a CRC test fails or a check for a presumed DCI format fails, in block 827 the UE continues with combining received signaling according to a second number of repetitions, assumed to be larger than the first number of repetitions, corresponding to a second RNTI (RNTI2); otherwise, the UE considers that the eNB transmitted the EPDCCH according to the first number of repetitions. In the de-masking operation, a RNTI2 mask 852 is used and a same process, as for de-masking with the RNTI1 mask, follows. If the UE detects a valid DCI format, the UE considers that the eNB transmitted the EPDCCH according to the second number of repetitions.

Similar to the operations in FIG. 7, although in FIG. 8 the operations for detecting a DCI format associated with the second RNTI follow the ones for the first RNTI, these operations can instead be performed in parallel. Moreover, if the UE detects a DCI format, it determines a first subframe for a respective PDSCH reception or PUSCH transmission based on a last subframe from the number of subframes corresponding to the number of repetitions associated with the detected DCI format.

In a third approach, a field in a DCI format indicates a number of repetitions for a respective EPDCCH transmission. In case a UE is configured by an eNB with two candidate numbers of repetitions for an EPDCCH transmission, a DCI format field having two values, with each value corresponding to a candidate number of repetitions, can uniquely indicate a number of EPDCCH repetitions.

When a UE is configured by an eNB with more than two candidate numbers of repetitions for an EPDCCH transmission, either a DCI format field having a respective number of more than two values or some restrictions can apply. In the latter case, two values of the DCI format field in conjunction with a number of repetitions required by the UE to detect the DCI format can be used by the UE to determine the number of repetitions where the eNB transmitted the EPDCCH according to the number of repetitions.

For example, when a DCI format field has two values and more than two candidate numbers of repetitions for an EPDCCH transmission, one value can indicate a nominal number of repetitions the eNB configures to the UE, such as based on an estimated coverage enhancement level for the UE, and the other value can indicate any other candidate number of repetitions. The nominal number of repetitions can be explicitly configured to the UE by the eNB or can be implicitly configured, such as a middle number of an odd number of configured candidate numbers of repetitions. The nominal number of repetitions can be assumed by the UE if a field in a detected DCI format indicates the nominal number of repetitions. There is no protection against an incorrect determination by a UE of a candidate number of repetitions other than the number of repetitions where the eNB transmits the EPDCCH according to the number of repetitions when both numbers are different than the nominal number. However, this event typically has a low probability to occur as it requires that a UE detects a DCI format with a substantially different number of repetitions than the one that the eNB transmitted the EPDCCH according to the number of repetitions. For example, assuming a nominal number of 8 repetitions for an EPDCCH transmission and a UE that is also configured to decode an EPDCCH with candidate numbers of 2, 4, and 16 repetitions, an error can occur if the eNB transmits an EPDCCH according to 16 repetitions and the UE detects the DCI format with 2 or 4 repetitions (unlikely), or if the eNB transmits an EPDCCH according to 4 repetitions and the UE detects the DCI format with 2 (unlikely for a nominal EPDCCH repetition number of 8) or 16 (unlikely for an actual EPDCCH repetition number of 4) repetitions, or if the eNB transmits an EPDCCH according to 2 repetitions (unlikely for a nominal repetition number of 8) and the UE detects the DCI format with 4 or 16 repetitions (unlikely for an actual EPDCCH repetition number of 2). Similar restrictions can apply for limiting a number of scrambling sequences to two or for limiting a number of RNTIs to two when possible numbers of EPDCCH repetitions are more than two.

Figure 9A:
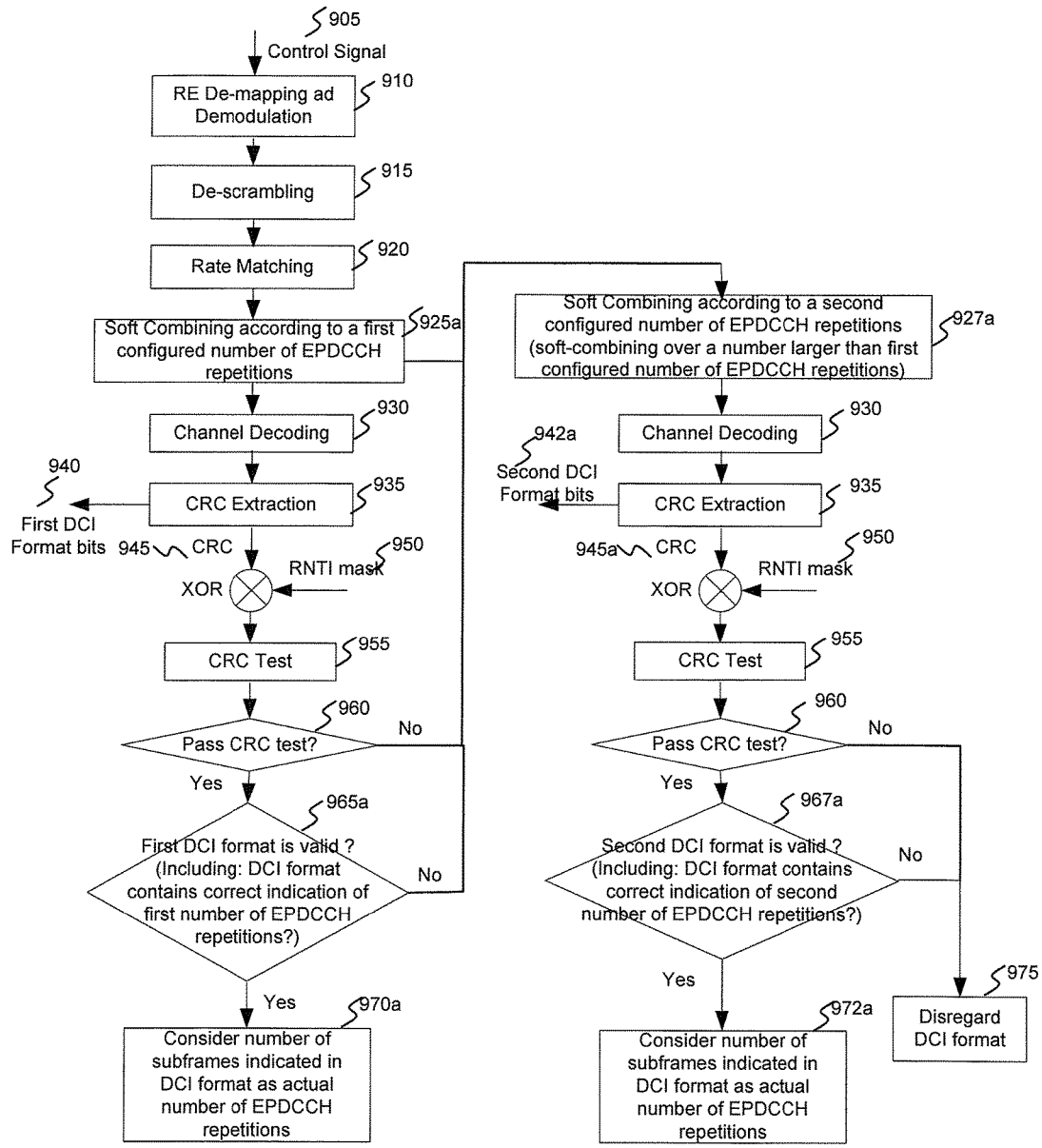
FIG. 9A illustrates an example operation for a UE to determine from a detected DCI format a number of repetitions, where an eNB transmits an EPDCCH that conveys the DCI format according to the number of repetitions, according to this disclosure.

FIG. 9A illustrates an example operation for a UE to determine from a detected DCI format a number of repetitions where an eNB transmits an EPDCCH that conveys the DCI format according to the number of repetitions. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain or processing circuitry in, for example, a UE.

Only operations different to the ones in FIG. 7 are described for brevity. That is, operations in blocks 905, 910, 920, 930, 935, 950, 955, 960, 965a, 970a, 975 of FIG. 9A are the same as, or similar to, respective operations in blocks 705, 710, 720, 730, 735, 750, 755, 760, 765, 770, 775 of FIG. 7. In block 925a, a UE combines received control signaling, according to a first candidate number of repetitions, other than the largest one, for an EPDCCH transmission, and decodes a presumed DCI format. If a CRC test is positive, the UE checks whether a DCI format is valid in block 965a. The UE also checks a DCI format field that indicates a number of repetitions for the EPDCCH transmission. If the DCI format is valid and the DCI format field has a value corresponding to the first number of repetitions, the UE considers the first number of repetitions as the one the eNB considered to transmit the EPDCCH in block 970a; otherwise, the UE considers in block 927a.

For example, a DCI format field that indicates a number of repetitions can include 1 bit, with a value '0' indicating a first candidate number of repetitions and a value '1' indicating a second candidate number of repetitions for an EPDCCH transmission. If in block 965a, after combining of 2 repetitions in block 925a, the UE determines the DCI format to be valid except for the DCI format field having a value '1', the UE considers a further check and proceeds with block 927a. In block 927a, the UE combines and decodes repetitions according to a second candidate number that is larger than the first candidate number of repetitions. If the CRC test is positive, the UE checks whether the DCI format is valid in block 967a, where the DCI format field that indicates the number of repetitions is also checked (and the DCI format is valid only if the DCI format field indicates the second candidate number of repetitions). If the DCI format is valid, the UE considers that the eNB transmitted the EPDCCH according to the second candidate number of repetitions in block 972a; otherwise, the UE can disregard the presumed DCI format in block 975a.

As an alternative operation for block 965a, the UE checks whether a DCI format is valid but without considering the value of the DCI format field that indicates the number of repetitions for the EPDCCH transmission. If the DCI format is valid, the UE considers that the eNB transmitted the EPDCCH according to the number of repetitions indicated in the DCI format field in block 970a; otherwise, the UE proceeds with block 927a. For example, a DCI format can include a 1-bit field for indicating a number of repetitions, with value '0' indicating a first candidate number of repetitions and value '1' indicating a second candidate number of repetitions. Then, if in block 965a and after combining a first number of repetitions in block 925a the UE determines the DCI format to be valid, the UE considers that the eNB transmitted the EPDCCH according to the first number of repetitions if the field has value '0' and considers that the eNB transmitted the EPDCCH according to the second number of repetitions if the field has value '1'. If the DCI format is not valid, the UE proceeds with block 927a.

Similar to the operations in FIG. 7, although in FIG. 9A the UE operations for detecting a DCI format associated with a second candidate number of repetitions for an EPDCCH transmission follow the ones for the first candidate number, the operations can instead be performed in parallel, or with a switched order of the right branch in FIG. 9A performed first then the left branch in FIG. 7. For example, for first and second configured candidate numbers of repetitions for an EPDCCH transmission, with the first number being smaller than the second number, a UE can first decode the DCI format by combining a number of repetitions where the number is greater than the first number of repetitions but no greater than the second number of repetitions, and, if the DCI format detection fails, the UE can continue by combining a number of repetitions where the number is no greater than the second number. For example, for first and second configured numbers of repetitions, with the first number being smaller than the second number, the UE can first decode a first number of repetitions and, if a DCI format detection fails, continue by combining a remaining number of repetitions until the second number of repetitions and perform an additional decoding or perform successive decoding for each combined repetition of an EPDCCH transmission.

Figure 9B:
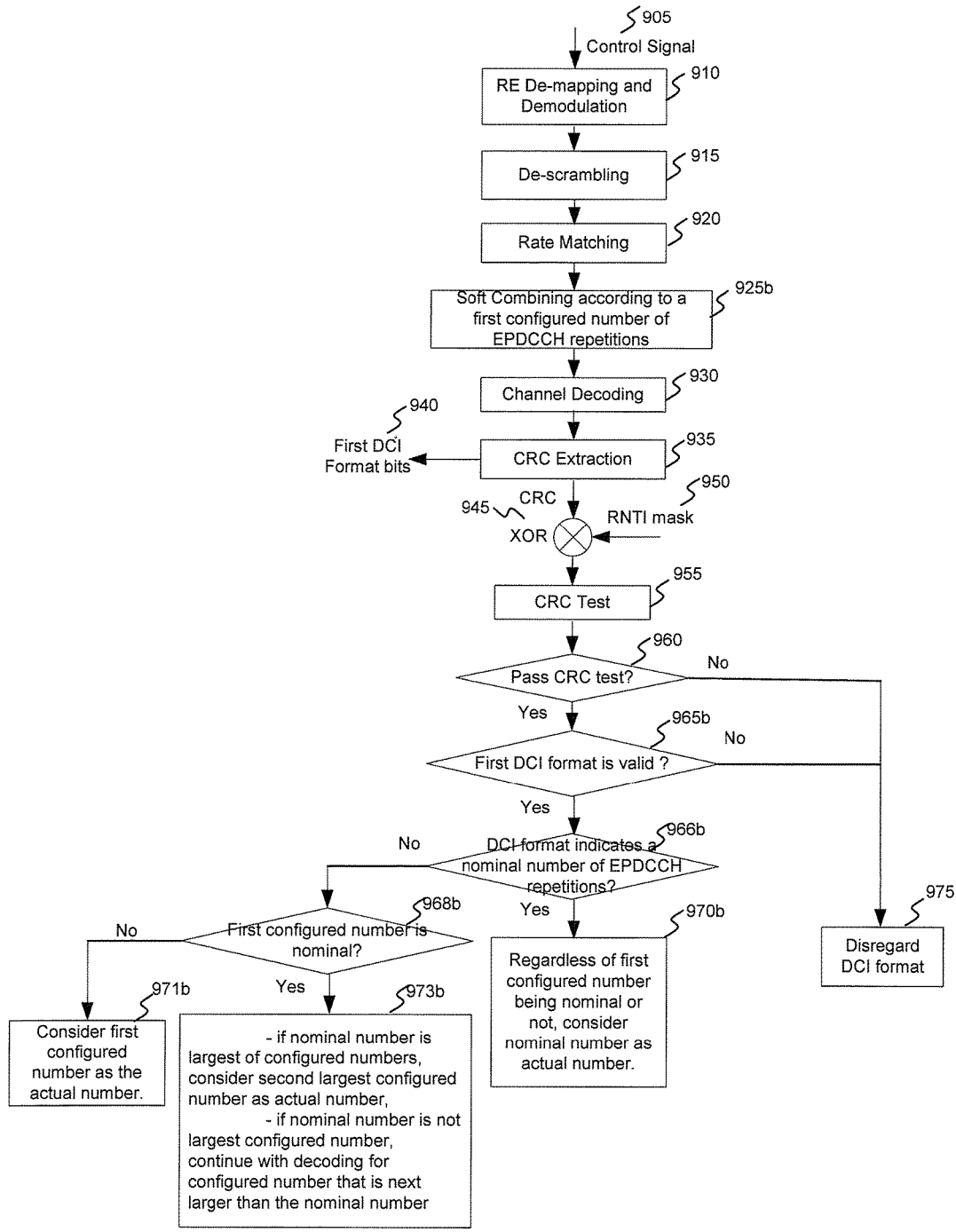
FIG. 9B illustrates an example operation for a UE to determine a number of repetitions for an EPDCCH transmission from a detected DCI format when the UE is configured with more than two candidate numbers of repetitions and the DCI format includes a field that indicates whether or not the number of repetitions is a nominal number according to this disclosure.

FIG. 9B illustrates an example operation for a UE to determine a number of repetitions for an EPDCCH transmission from a detected DCI format when the UE is configured with more than two candidate numbers of repetitions and the DCI format includes a field that indicates whether or not the number of repetitions is a nominal number. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain or processing circuitry in, for example, a UE.

Only operations different to the ones in FIG. 9B are described for brevity. That is, operations in blocks 905, 910, 920, 930, 935, 950, 955, 960, 965b, 970b, 975 of FIG. 9B are the same as, or similar to, respective operations in blocks 705, 710, 720, 730, 735, 750, 755, 760, 765, 770, 775 of FIG. 7. In step 925b, the UE combines and decodes received control signaling according to a first configured candidate number of repetitions for an EPDCCH transmission. If a CRC test is positive, the UE checks whether a DCI format is valid 965b. In step 965b, the UE does not consider a field included in the DCI format to indicate a number of repetitions for the EPDCCH transmission.

a) If the DCI format is valid and the field in the DCI format indicates the nominal number of repetitions, and the first configured number is the nominal number, the UE considers that the eNB transmitted the EPDCCH according to the nominal number of repetitions 970b.

b) If the DCI format is valid and the field in the DCI format does not indicate the nominal number and the first configured number is not the nominal number, the UE considers that the eNB transmitted the EPDCCH according to the first configured number of repetitions 971b.

c) If the DCI format is valid and the field in the DCI format indicates the nominal number and the first configured number is not the nominal number, the UE considers that the eNB transmitted the EPDCCH according to the nominal number of repetitions 970b.

d) If the DCI format is valid and the field in the DCI format does not indicate the nominal number and the first configured number is the nominal number then, if the nominal number is the largest of the configured numbers, the UE considers that the eNB transmitted the EPDCCH according to the second largest configured number of repetitions 973b while if the nominal number is not the largest configured number, the UE continues with a decoding for the configured number that is the next larger than the nominal number.

e) If the DCI format is not valid, the UE disregards the presumed DCI format 975.

The functionalities in FIG. 9A or FIG. 9B reflect a possibility that a DCI format can be detected in general for a number of repetitions that is different than the one that the eNB transmitted the EPDCCH according to and, in particular, for a number of repetitions that is smaller than the one that the eNB transmitted the EPDCCH according to (it is not necessary for a UE to have multiple configured numbers of repetitions for an EPDCCH transmission). This observation can allow a UE to separately decode each repetition of an EPDCCH transmission and if it detects a valid DCI format prior to a completion of a configured number of repetitions, the UE can suspend further EPDCCH reception and decoding operations in order to conserve power. For determining a timing of a PDSCH reception or a PUSCH transmission, the UE can assume that the DCI format is conveyed with the configured number of repetitions for the EPDCCH transmission.

In a fourth approach, a different DCI format can be associated with a different number of repetitions for an EPDCCH transmission. For example, a DCI format with a first size can be associated with a largest configured number of repetitions while a DCI format with a second size can be associated with a configured number of repetitions other than the largest one. The size of the first DCI format can be larger than the size of the second DCI format. The UE operations for determining a number of repetitions for an EPDCCH transmission can be as described in FIG. 7 with the exception that instead of a different scrambling sequence, a different DCI format is considered.

In a fifth approach, a different EPDCCH search space can be associated with a different number of repetitions for an EPDCCH transmission where non-overlapping or partially overlapping search spaces can be associated with different numbers of repetitions. A first set of ECCEs can be predetermined for use in case the eNB transmits an EPDCCH according to a first number of repetitions and a second set of ECCEs can be predetermined for use in case the eNB transmits an EPDCCH according to a second number of repetitions.

For a low cost UE capable of receiving DL transmissions in, for example, 6 RBs over a subframe and for a number of 4 ECCEs per RB as in REF 1, a total number of ECCEs is 24. This assumes that a low cost UE operating with DL coverage enhancements is either configured one RB set of 6 RBs or two RB sets of 3 RBs each for EPDCCH reception.

If a number of repetitions for an EPDCCH transmission is determined by a UE based on a use of respective different EPDCCH search spaces, 12 ECCEs, such as the 12 first indexed ECCEs, of the 24 ECCEs can be associated with a first EPDCCH candidate and the other 12 ECCEs, such as the 12 last indexed ECCEs, of the 24 ECCEs can be associated with a second EPDCCH candidate. For a first number of repetitions, a UE can monitor EPDCCH candidates $\{1, 2, 1, 2, \ldots\}$ (or $\{2, 1, 2, 1, \ldots\}$) in subframes $\{1, 2, 3, 4, \ldots\}$ while for a second number of repetitions, a UE can monitor EPDCCH candidates $\{1, 1, 1, 1, \ldots\}$ (or $\{2, 2, 2, 2, \ldots\}$) in subframes $\{1, 2, 3, 4, \ldots\}$ where repetitions of an EPDCCH are transmitted. A same principle can apply for EPDCCH candidates of any other ECCE aggregation level (other than 12 ECCEs). The patterns of candidates in different subframes for different numbers of repetitions of an EPDCCH transmission can also be orthogonal. For example, for a first number of repetitions, the UE can monitor candidates $\{1, 1, 1, 1, \ldots\}$ (or $\{1, 2, 1, 2\}$) in subframes $\{1, 2, 3, 4, \ldots\}$ while for a second number of repetitions, a UE can monitor candidates $\{2, 2, 2, 2, \ldots\}$ (or $\{2, 1, 2, 1\}$) in subframes $\{1, 2, 3, 4, \ldots\}$ where repetitions of an EPDCCH are transmitted.

Figure 10:
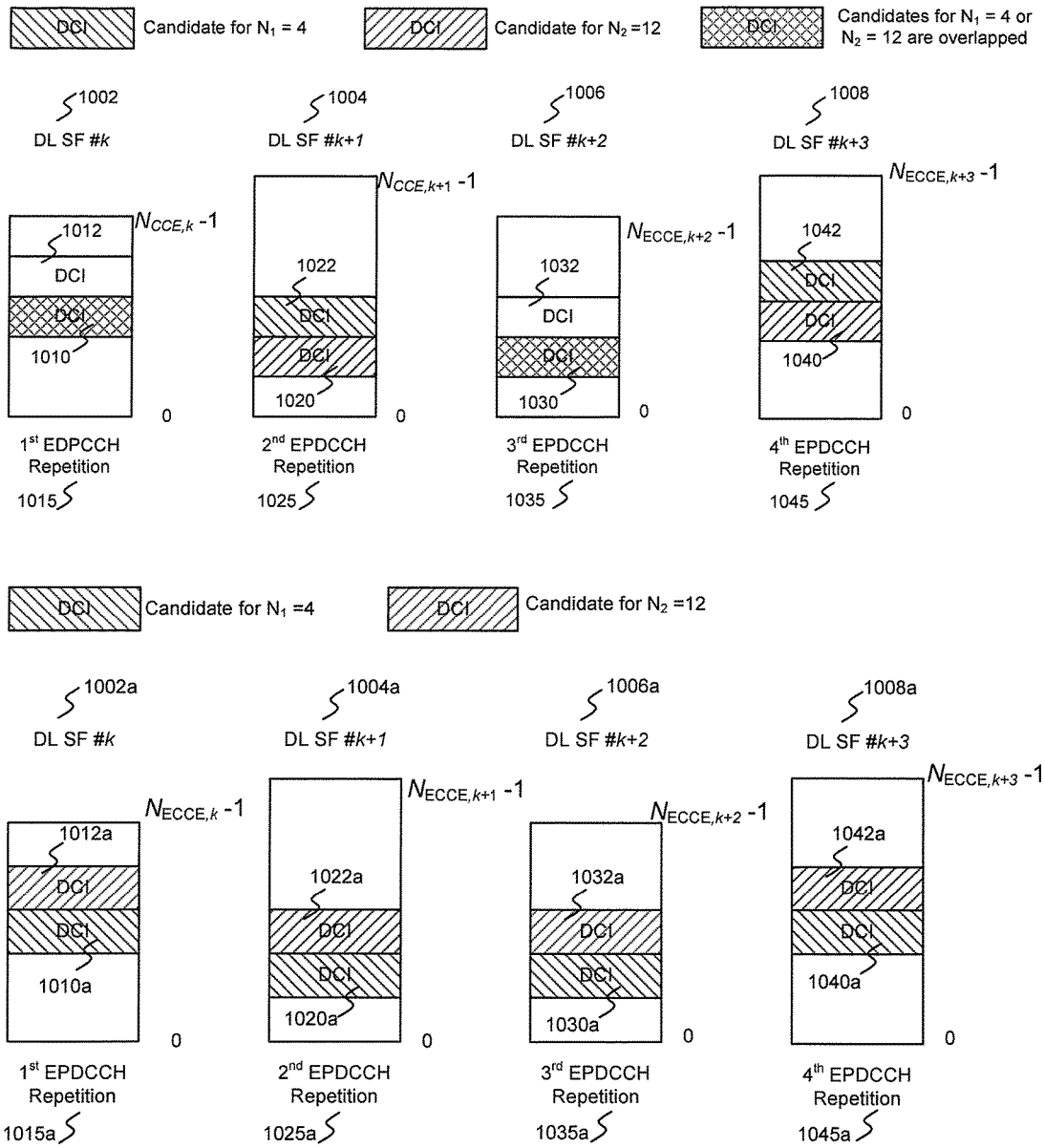
FIG. 10 illustrates an example allocation of EPDCCH candidates in different subframes according to a first candidate number of repetitions and according to a second candidate number of repetitions for an EPDCCH transmission according to this disclosure.

FIG. 10 illustrates an example allocation of EPDCCH candidates in different subframes according to a first candidate number of repetitions and according to a second candidate number of repetitions for an EPDCCH transmission. The embodiment of the allocation of EPDCCH candidates shown in FIG. 10 is for illustration only. Other embodiments of the allocation of EPDCCH candidates can be used without departing from the scope of the present disclosure.

A UE, such as UE 114, is configured by an eNB, such as eNB 102, with two exemplary repetition numbers for an EPDCCH transmission; $N_1=4$ and $N_2=12$. In each DL subframe that can support EPDCCH transmissions, the UE monitors an applicable EPDCCH candidate for an aggregation of 12 ECCEs. In a first approach, in DL subframe k 1002, the UE considers a first EPDCCH candidate for both repetition numbers 1010 for a first EPDCCH transmission 1015. In DL subframe k+1 1004, the UE considers a first EPDCCH candidate for $N_2=12$ repetitions 1020 and a second EPDCCH candidate for $N_1=4$ repetitions 1022 for a second EPDCCH transmission 1025. In DL subframe k+2 1006, the UE considers a first EPDCCH candidate for both repetition numbers 1030 for a third EPDCCH transmission 1035. In DL subframe k+3 1008, the UE considers a first EPDCCH candidate for $N_2=12$ repetitions 1040 and a second EPDCCH candidate for $N_1=4$ repetitions 842 for a fourth EPDCCH transmission 1045. In a second approach, in DL subframes k 1002a, k+1 1004a, k+2 1006a, and k+3 1008a, the UE considers a first EPDCCH candidate for $N_1=4$ repetitions 1010a, 1020a, 1030a, and 1040a, respectively, and considers a second EPDCCH candidate for $N_2=12$ repetitions 1012a, 1022a, 1032a, and 1042a, respectively, for a first 1015a, second 1025a, third 1035a, and fourth 1045a repetition, respectively.

In a sixth approach, different CRC generator polynomials can be used to generate different CRCs for different numbers of repetitions for an EPDCCH transmission, where each CRC polynomial corresponds to each number of repetitions from a configured set of numbers of repetitions. For example, a first CRC generator polynomial can correspond to a first number of repetitions and a second CRC generator polynomial can correspond to a second number of repetitions. A UE can use the first CRC generator polynomial to check a CRC of a DCI format decoding according to the first number of repetitions and use the second CRC generator polynomial to check a CRC of a DCI format decoding according to the second number of repetitions. If a DCI format is detected for a CRC associated with a number of repetitions, the UE determines a first subframe for a respective PDSCH reception or PUSCH transmission based on a last subframe from the number of subframe corresponding to the number of repetitions of the EPDCCH transmission conveying the detected DCI format.

In a seventh approach, a mapping of DCI format symbols to REs of a set of RBs used for EPDCCH transmission in a subframe depends on a number of repetitions where an eNB, such as eNB 102, transmits an EPDCCH to a UE, such as UE 114, according to the number of repetitions. As described in REF 1, DCI format symbols are mapped sequentially to available REs of a respective EPDCCH transmission. For an EPDCCH transmission with repetitions, the sequential mapping can apply when the EPDCCH transmission is with the smallest of a number of repetitions, $N_1$, that the eNB configures to the UE. For each EPDCCH transmission with a number of repetitions other than the smallest one, a different mapping of DCI format symbols to available REs can apply. For example, instead of sequentially mapping a block of y(0), y(1), . . . , y($M_{symb}$−1) DCI format symbols to REs of a respective EPDCCH transmission starting with the first RE as in case the eNB considers $N_1$ repetitions to transmit an EPDCCH to the UE, a shift of one DCI format symbol can apply for the next higher number of configured repetitions, $N_2$, so that a resulting block of y(1), . . . , y($M_{symb}$−1), y(0) (or y($M_{symb}$−1), y(0), y(1), . . . , y($M_{symb}$−2)) is sequentially mapped to available REs of the EPDCCH transmission. This principle can be extended for other configured numbers of repetitions and, for example, for the third smallest number of configured repetitions, $N_3$, a resulting block can be y(2), . . . , y($M_{symb}$−1), y(0), y(1) (or y($M_{symb}$−2), y($M_{symb}$−1), y(0), . . . , y($M_{symb}$−3)). In general, for a UE configured with P repetition numbers for an EPDCCH transmission and for repetition number p, 0≤p≤P−1, the block of DCI format symbols that is sequentially mapped to available REs is y(p), . . . , y($M_{symb}$−1), y(0), . . . , y(p−1). Even though a shift of one DCI format symbol was considered in the above example, the shift can be equal to any number of DCI format symbols (smaller than $M_{symb}$).

Figure 11:
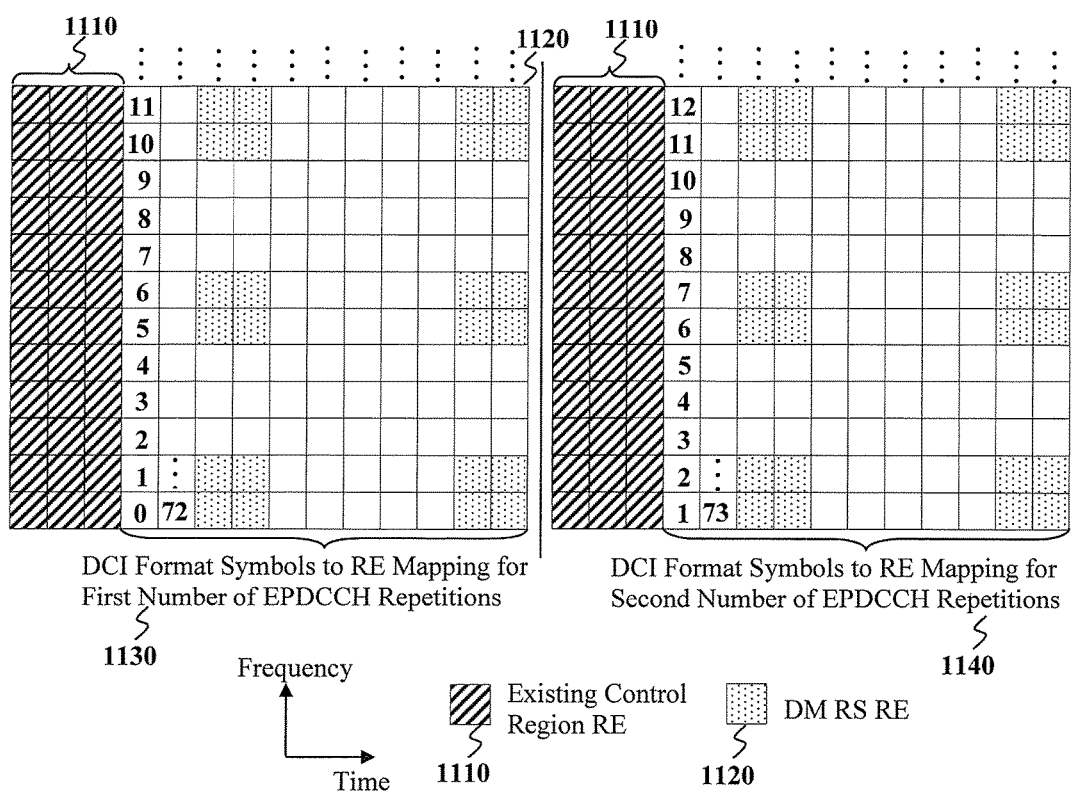
FIG. 11 illustrates an example mapping of DCI format symbols to available REs in a subframe according to a candidate number of repetitions for a respective EPDCCH transmission according to this disclosure.

FIG. 11 illustrates an example mapping of DCI format symbols to available REs in a subframe according to a candidate number of repetitions for a respective EPDCCH transmission. The embodiment of the mapping of DCI format symbols shown in FIG. 11 is for illustration only. Other embodiments of the mapping of DCI format symbols can be used without departing from the scope of the present disclosure.

A UE, such as UE 114, is configured by an eNB, such as eNB 102, a first number of repetitions, $N_1$, and a second number of repetitions, $N_2$, for an EPDCCH transmission. All available REs in a set of 6 RB can be used for a repetition of an EPDCCH transmission where the available REs are defined as in REF 1 and exclude at least REs used to transmit other control channels 1110 and REs used for DMRS transmission 1120. If the eNB considers $N_1$ repetitions to transmit an EPDCCH to the UE, the eNB sequentially maps a block of y(0), y(1), . . . , y($M_{symb}$−1) DCI format symbols to available REs in the set of 6 RBs over a subframe 1130. If the eNB considers $N_2$ repetitions to transmit the EPDCCH to the UE, the eNB sequentially maps the block of y(1), . . . , y($M_{symb}$−1), y(0) DCI format symbols to available REs in the set of 6 RBs over a subframe after 1140.

In a variation of the seventh approach, the time unit for the mapping of the block of DCI format symbols to REs is modified from being a subframe to being $N_1$ subframes in case of $N_1$ configured repetitions for an EPDCCH transmission and being $N_2$ subframes in case of $N_2$ configured repetitions for an EPDCCH transmission. Then, a block of y(0), y(1), . . . , y($M_{symb}$−1) DCI format symbols is sequentially mapped, possibly with repetitions of the total of $M_{symb}$ symbols, to available REs over $N_1$ subframes instead of being sequentially mapped to available REs of one subframe and then continuing from the first symbol, y(0), in a next subframe. In case the eNB transmits the EPDCCH to the UE using $N_2$ repetitions, the block of DCI format symbols that is mapped sequentially to available REs over $N_2$ subframes can be y(1), . . . , y($M_{symb}$−1), y(0) or any other permutation of the block of DCI format symbols y(0), y(1), . . . , y($M_{symb}$−1).

Figure 12:
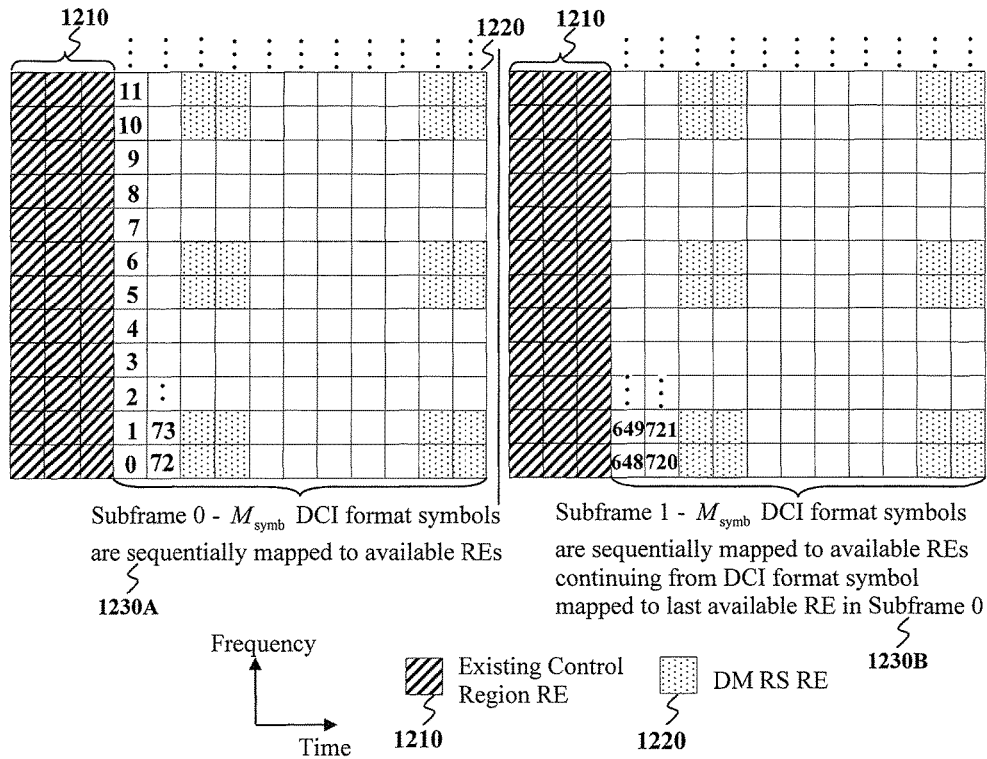
FIG. 12 illustrates an example mapping of DCI format symbols to available REs over a number of subframes used for repetitions of an EPDCCH transmission according to this disclosure.

FIG. 12 illustrates an example mapping of DCI format symbols to available REs over a number of subframes used for repetitions of an EPDCCH transmission. The embodiment of the mapping of DCI format symbols shown in FIG. 12 is for illustration only. Other embodiments of the mapping of DCI format symbols can be used without departing from the scope of the present disclosure.

A UE, such as UE 114, is configured by an eNB, such as eNB 102, a number of repetitions, $N_1$, for an EPDCCH transmission. All available REs in a set of 6 RB can be used for a repetition of an EPDCCH transmission where the available REs are defined as in REF 1 and exclude at least REs used to transmit other control channels 1210 and REs used for DMRS transmission 1220. The eNB sequentially maps a block of y(0), y(1), . . . , y($M_{symb}$−1) DCI format symbols to available REs in the set of RBs over $N_1$ subframes where the EPDCCH can be transmitted 1230. For example, for $M_{symb}$=84, the first DCI format symbol in subframe 1 is symbol 648−⌊648/84⌋·84=60 instead of being symbol 0.

The mapping of the DCI format symbols to available REs over a number of configured repetitions for an EPDCCH transmission can apply in general, including the case that a UE is configured a single number of repetitions for an EPDCCH transmission or including the case that a different approach is used to differentiate EPDCCH transmissions with different numbers of repetitions.

In all previous approaches, a UE can combine any number of repetitions for an EPDCCH transmission and perform decoding for a DCI format as long as the number does not exceed a configured number of EPDCCH repetitions, such as $N_1$ or $N_2$. This can potentially enable a UE to perform early detection of a DCI format and turn off its power (if it has not other transmission or reception) in order to conserve power until it needs to transmit or receive other signaling (e.g. transmit the PUSCH scheduled by the DCI format or receive the PDSCH scheduled by the DCI format).

A UE, such as UE 114, can also report to an eNB, such as eNB 102, a number of repetitions the UE required to detect an EPDCCH or a number of repetitions the UE required to detect a PDSCH. This number of repetitions can be an average number of repetitions over a predefined time period or since the last report. The report can be triggered by the eNB using RRC signaling and provided by the UE using, for example, RRC signaling or a Medium Access Control (MAC) control element (see also REF 4). Alternatively, the report can be triggered by the UE, and provided by a MAC control element or by RRC signaling, if the average number of EPDCCH repetitions or PDSCH repetitions the UE requires to detect a respective EPDCCH transmission (DCI format) or PDSCH transmission (data transport block) changes beyond a threshold that can be either configured to the UE by the eNB or determined by the UE implementation, or specified in the system operation.

Although the eNB can obtain an estimate for a path-loss experienced by the UE through a number of repetitions needed for the eNB to detect, for example, a PUCCH transmission or a PUSCH transmission from the UE, it may not be possible to determine a number of repetitions the UE requires to decode an EPDCCH or a PDSCH with a required detection reliability as this can depend on the UE receiver performance attributes and as the DL channel medium conditions, such as interference, can be different than the UL channel medium conditions. For example, a UE receiver equipped with 2 receiver antennas can require a substantially smaller number of EPDCCH repetitions or PUSCH repetitions to detect a respective EPDCCH transmission or PDSCH transmission than a UE receiver equipped with 1 receiver antenna. Similar, a UE receiver equipped with 2 receiver antennas having low correlation or low gain imbalance can require a substantially smaller number of EPDCCH repetitions or PUSCH repetitions than a UE receiver equipped with 2 receiver antennas having large correlation or large gain imbalance. Similar, a UE receiver implementing an advanced channel estimator can require a substantially smaller number of EPDCCH repetitions or PUSCH repetitions than a UE receiver implementing a basic channel estimator.

The eNB can therefore obtain combined capabilities of the UE receiver by requesting or obtaining a report from the UE for a number of repetitions the UE required to detect an EPDCCH transmission or a PDSCH transmission over a time period and the UE can provide that report in order to enable the eNB to determine an appropriate number of EPDCCH repetitions or PDSCH repetitions, thereby improving a system spectral efficiency and ensuring a desired communication quality with the UE. The report can include an average number of EPDCCH repetitions or PDSCH repetitions and can possibly include additional statistics such as a respective minimum number or a respective maximum number of repetitions. The report represents a change in the channel medium or the interference the UE experiences over the time period. The UE can trigger and report an update in a number of repetitions for an EPDCCH or a PDSCH transmission it requires for detecting a DCI format or a data transport block, respectively, using a MAC control element or using RRC signaling if the number of respective repetitions changes beyond a threshold.

Similar to a dynamic adaptation for a number of repetitions for an EPDCCH transmission, an eNB, such as eNB 102, can apply a dynamic adaptation to a number of repetitions for a PDSCH transmission in general and for a SPS PDSCH transmission in particular. A UE, such as UE 114, can decode SPS PDSCH receptions according to a set of $\{M_1, \ldots, M_P\}$ repetition numbers configured by the eNB to the UE for a PDSCH transmission. Similar approaches as for a UE to determine a number of repetitions for an EPDCCH transmission can apply for a UE to determine a number of repetitions for a PDSCH transmission, from candidate repetition numbers $\{M_1, \ldots, M_P\}$.

A UE, such as UE 114, can transmit a HARQ-ACK signal in response to a detection of a DCI format starting from a subframe determined based on a last subframe from a number of subframes corresponding to a number of repetitions for a respective PDSCH transmission to the UE. For example, a different scrambling sequence, or a different RNTI, or a different mapping of the data transport block symbols to REs can be associated with each of the $\{M_1, \ldots, M_P\}$ configured numbers of repetitions. For a PDSCH transmission scheduled by a DCI format, the DCI format can indicate the number of repetitions for the PDSCH transmission.

In case frequency-hopping is used for repetitions of a PDSCH transmission from an eNB, such as eNB 102, a different hopping pattern can apply for different repetition numbers of PDSCH transmissions. For example, assuming that a first set of RBs or a second set of RBs are available to transmit a PDSCH in a subframe then, for a first number of PDSCH repetitions, a UE, such as UE 114, can receive PDSCH in sets of RBs {1, 1, 2, 2, ...} in subframes {1, 2, 3, 4, ...} where PDSCH repetitions are transmitted while, for a second number of repetitions, the UE can receive PDSCH in sets of RBs {2, 2, 1, 1, ...} in subframes {1, 2, 3, 4, ...} where PDSCH repetitions are transmitted. The first set of RBs and the second set of RBs belong to a same set of T contiguous RBs for a UE that is capable of receiving DL transmissions only in a set of T contiguous RBs in a subframe. For example, T=6. The hopping pattern remains same over at least two DL subframes in order to enable the UE to enhance a channel estimate the UE uses to demodulate PDSCH symbols by the UE interpolating RS symbol over the at least two subframes (this frequency-hopping is also applicable for repetitions of an EPDCCH transmission).

Frequency hopping can also apply across different sets of T contiguous RBs. Then, as a UE is capable of receiving only within a same set of T contiguous RBs in a subframe, the hopping pattern in different sets of T contiguous RBs is same in first $M_1$ subframes for a first configured number of $M_1$ repetitions and for a second configured number of $M_2$ repetitions for a PDSCH transmission. Similar to frequency hopping within a same set of T contiguous RBs, at least two repetitions of a PDSCH transmission in two respective subframes are in a same set of T contiguous RBs in order to enable a UE to enhance a channel estimate.

Figure 13:
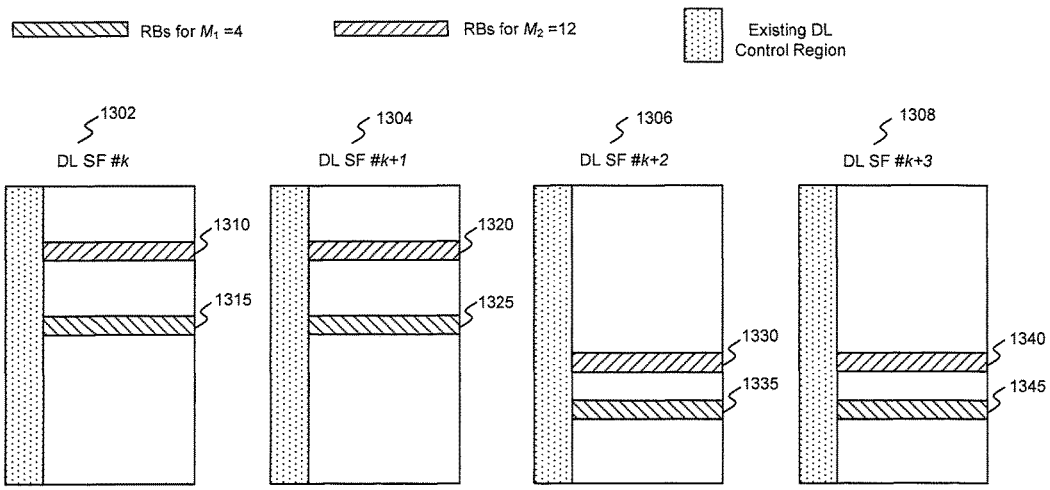
FIG. 13 illustrates an example for frequency hopping of PDSCH repetitions in different subframes according to a first candidate number of PDSCH repetitions or according to a second candidate number of PDSCH repetitions according to this disclosure.

FIG. 13 illustrates an example for frequency hopping of PDSCH repetitions in different subframes according to a first candidate number of PDSCH repetitions or according to a second candidate number of PDSCH repetitions. The embodiment of the frequency hopping of PDSCH repetitions shown in FIG. 13 is for illustration only. Other embodiments of the frequency hopping of PDSCH repetitions can be used without departing from the scope of the present disclosure.

A UE is configured with two exemplary PDSCH repetition numbers; $M_1=4$ and $M_2=12$. In DL subframes k 1302 and k+1 1104, the UE monitors a PDSCH in RBs 1310 and in RBs 1320, respectively, for $M_2=12$ PDSCH repetitions and monitors a PDSCH in RBs 1315 and in RBs 1325, respectively, for $M_1=4$ PDSCH repetitions. In DL subframes k+2 1306 and k+3 1308, the UE monitors a PDSCH in RBs 1330 and in RBs 1340, respectively, for $M_2=12$ PDSCH repetitions and monitors a PDSCH in RBs 1335 and in RBs 1345, respectively, for $M_1=4$ PDSCH repetitions. It is also possible to use the same RBs to transmit PDSCH for $M_1$ repetitions or $M_2$ repetitions and the RBs can include all T contiguous RBs during a frequency hopping instance.

A switching subframe without a PDSCH (or EPDCCH) transmission can also be included between each frequency hopping in different sets of RBs to allow the UE to re-tune its RF to the new set of RBs.

Similar to repetitions of an EPDCCH transmission, a UE, such as UE 114, can combine any number of repetitions for a PDSCH transmission from an eNB, such as eNB 102, and perform decoding to detect a data transport block provided that the number does not exceed a maximum candidate number of repetitions the UE is configured by the eNB through higher layer signaling for a PDSCH transmission. This can potentially enable a UE to perform early detection of a data transport block and turn off its power (if the UE does not have other transmission or reception) in order to conserve power until it needs to transmit or receive other signaling.

For Case 1, a UE, such as UE 114, determines a starting subframe for a reception of a PDSCH transmission from an eNB, such as eNB 102, based on a last subframe from a number of subframes corresponding to a number of repetitions for an EPDCCH transmission from the eNB that conveys a DCI format scheduling the PDSCH reception by the UE. In response to the PDSCH reception, the UE needs to determine a starting subframe for a transmission of an HARQ-ACK signal.

If the number of repetitions for a PDSCH transmission is not fixed and it is not explicitly indicated to the UE by the eNB, for example by the DCI format in case of dynamic scheduling of the PDSCH using an EPDCCH, the UE can assume a maximum configured number of repetitions for the PDSCH reception and accordingly determine a starting subframe to transmit an HARQ-ACK signal (based on a last subframe from a maximum number of subframes corresponding to the maximum number of repetitions for the PDSCH transmission). This is because the UE may not correctly detect the data transport block conveyed by the PDSCH. In such case the UE may not be able to determine a number of repetitions by implicit means, such as for example by the eNB using a different mapping or a different scrambling sequence depending on a number of repetitions, where the eNB transmits the PDSCH according to the number of repetitions.

Figure 14:
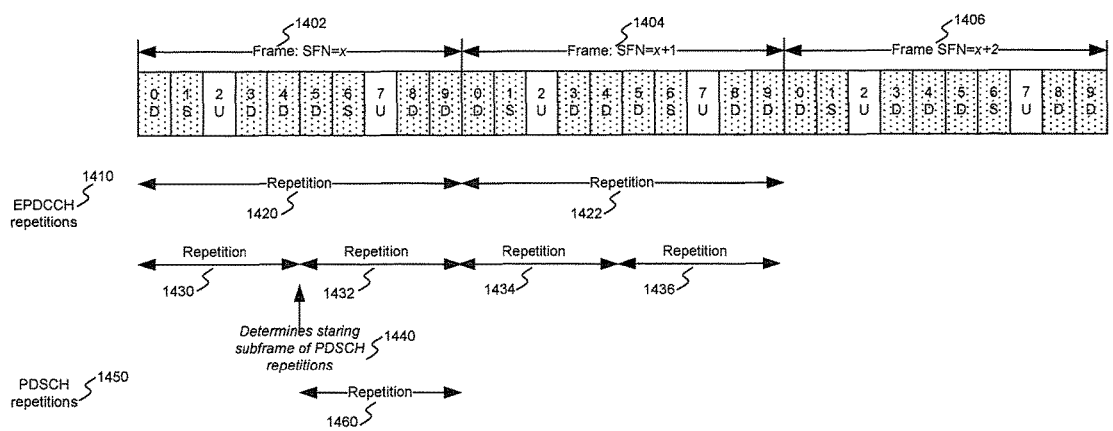
FIG. 14 illustrates an operation for a UE to determine a starting subframe for a PDSCH reception scheduled by a detected DCI format conveyed by a first candidate number of repetitions from two candidate numbers of repetitions for an EPDCCH transmission according to this disclosure.

FIG. 14 illustrates an operation for a UE to determine a starting subframe for a PDSCH reception scheduled by a detected DCI format conveyed by a first candidate number of repetitions from two candidate numbers of repetitions for an EPDCCH transmission. The embodiment the operation for a UE determination shown in FIG. 14 is for illustration only. Other embodiments of the operation for a UE determination can be used without departing from the scope of the present disclosure.

A UE, such a UE 114, is configured by an eNB, such as eNB 102, with two exemplary EPDCCH repetition numbers, $N_1=4$ and $N_2=8$, and operates in a TDD system using TDD UL-DL configuration 2 (see also REF 1). A starting subframe for EPDCCH repetitions 1410 is a first subframe in a frame. In System Frame Number (SFN) x 1402, the UE monitors at least one EPDCCH candidate per DL subframe for $N_2=8$ repetitions 1420 and at least one candidate per DL subframe for first $N_2=4$ repetitions 1430 and second $N_1=4$ repetitions 1432. The UE detects a valid DCI format scheduling a PDSCH after decoding first $N_1=4$ repetitions 1430 and determines a starting DL subframe 1440 for PDSCH reception 1450 to be a first DL subframe after a last DL subframe of first $N_1=4$ repetitions 1430. The UE subsequently receives the PDSCH where the reception is over 4 DL subframes 1460. Additional subframes can be included between the subframe of the last repetition for the EPDCCH conveying the DCI format detected by the UE and the subframe of the first repetition for the scheduled PDSCH such as, for example, one subframe to allow the UE to re-tune to a different part of the system bandwidth in order to support EPDCCH transmission and PDSCH transmission in different sets of T contiguous RBs.

For a HARQ-ACK signal transmission by a UE, such as UE 114, in response to a reception of a PDSCH transmission or of an EPDCCH conveying an SPS release by an eNB, such as eNB 102, a starting subframe can be subframe n+k where n is a last subframe of a maximum number of subframes corresponding to a maximum number of PDSCH or EPDCCH repetitions configured to the UE by the eNB, respectively and, for example, k can be 4 for a FDD system or determined based on a mapping table for a TDD system (see also REF 3).

Figure 15:
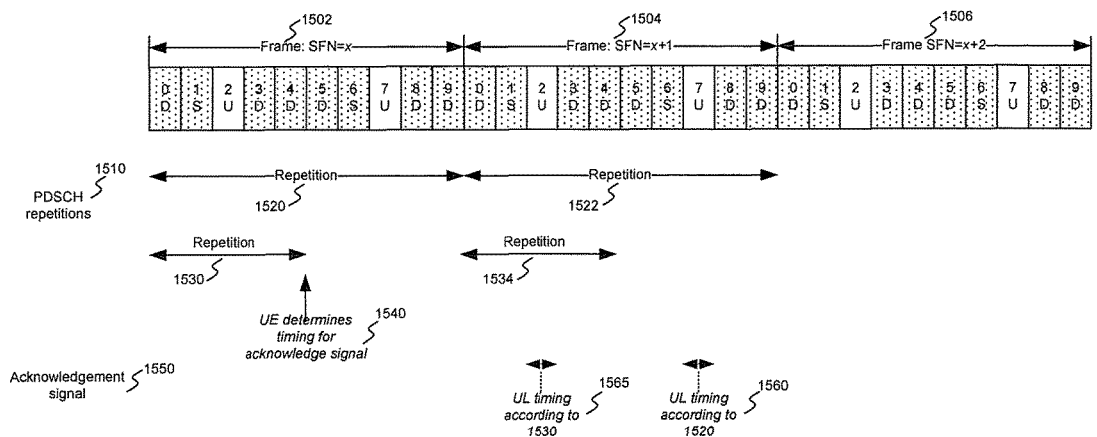
FIG. 15 illustrates an operation for a UE to determine a starting subframe for a HARQ-ACK signal transmission in response to a PDSCH reception over a first number of subframes from two candidate numbers of subframes.

FIG. 15 illustrates an operation for a UE to determine a starting subframe for a HARQ-ACK signal transmission in response to a PDSCH reception over a first number of subframes from two candidate numbers of subframes. The embodiment the operation for a UE determination shown in FIG. 15 is for illustration only. Other embodiments of the operation for a UE determination can be used without departing from the scope of the present disclosure.

A UE, such a UE 114, is configured by an eNB, such as eNB 102, with two exemplary PDSCH repetition numbers, $M_1=4$ and $M_2=8$, and operates in a TDD system using TDD UL-DL configuration 2. A starting subframe for repetitions of a PDSCH transmission 1510 is a first subframe in each frame. In SFN x 1502, the UE monitors $M_2=8$ repetitions 1520 and $M_1=4$ repetitions 1530. The UE correctly detects a data transport block after decoding first $M_1=4$ repetitions 1530 and determines a starting UL subframe 1540 for a HARQ-ACK signal transmission 1550 to be according to a timing associated with $M_2=8$ repetitions 1560 and not according to a timing associated with $M_1=4$ repetitions 1565 for a PDSCH transmission.

In order to avoid a UE, such as UE 114, having to determine the first subframe for HARQ-ACK signal transmission to an eNB, such as eNB 102, based on the maximum number of configured repetitions for a PDSCH transmission from the eNB, the number of repetitions for a PDSCH can be explicitly informed through a respective DCI format, in case of a dynamically scheduled PDSCH, or the UE can transmit the HARQ-ACK signal only when it conveys a positive HARQ-ACK information (ACK) regarding the detection of a data transport block in the PDSCH and not transmit the HARQ-ACK signal in case the UE failed to detect the data transport block in the PDSCH. In case the UE transmits a HARQ-ACK signal only if it conveys positive HARQ-ACK information, the implicit approaches, such as using a permutation in the mapping of data transport block symbols to REs according to a number of repetitions for the PDSCH transmission, can be supported for the UE to determine the number of repetitions, among configured numbers of repetitions, to assume for the transmission of the PDSCH.

A UE, such as UE 114, transmitting a HARQ-ACK signal to an eNB, such as eNB 102, only in case of positive HARQ-ACK information (ACK) can apply in general because for small data transport block sizes associated with operation in low SINRs, a practically same performance is achieved for retransmissions of a data transport block regardless of whether this is due to the UE failing to detect the DCI format in an EPDCCH or due to the UE failing to detect the data transport block in a PDSCH. This is because the use of incremental redundancy, where the eNB uses a different redundancy version in case the UE detected the DCI format but failed to detect the data transport block (see also REF 2 and REF 3), does not provide material gains in case of small data transport blocks for UE operation in low SINRs.

Case 2: UE determines starting subframe for a PDSCH reception or for a PUSCH transmission based on a maximum configured number of repetitions for an EPDCCH transmission conveying a DCI format scheduling the PDSCH or the PUSCH. UE determines starting subframe for a HARQ-ACK transmission in response to detecting a data transport block or a DCI format based on a maximum configured number of repetitions for the PDSCH or the EPDCCH transmission, respectively.

Unlike Case 1 where a starting subframe for a UE, such as UE 114, to receive a PDSCH transmitted from an eNB, such as eNB 102, or to transmit a PUSCH to the eNB is determined from a last subframe of a number of subframes corresponding to a number of repetitions, where the eNB transmitted an EPDCCH conveying a DCI format scheduling the PDSCH or the PUSCH according to the number of repetitions, for Case 2 a respective starting subframe is fixed based on a maximum number of repetitions regardless of a number of repetitions, where the eNB transmitted the respective EPDCCH according to the number of repetitions.

The eNB configures to the UE a maximum number of repetitions for an EPDCCH transmission. This maximum number can also be the only number of repetitions for an EPDCCH transmission the eNB configures to the UE. As for Case 1, the eNB can transmit an EPDCCH or the UE can detect a DCI format conveyed by the EPDCCH with a smaller number of repetitions than the maximum one. If the UE detects a DCI format for a number of repetitions of an EPDCCH reception that is smaller than the one configured by the eNB, the UE can go into an idle (sleep) mode until a first subframe of a PDSCH reception or a PUSCH transmission that is scheduled by the detected DCI format and determined by the UE from the maximum number of repetitions for an EPDCCH transmission the UE is configured from the eNB.

Figure 16:
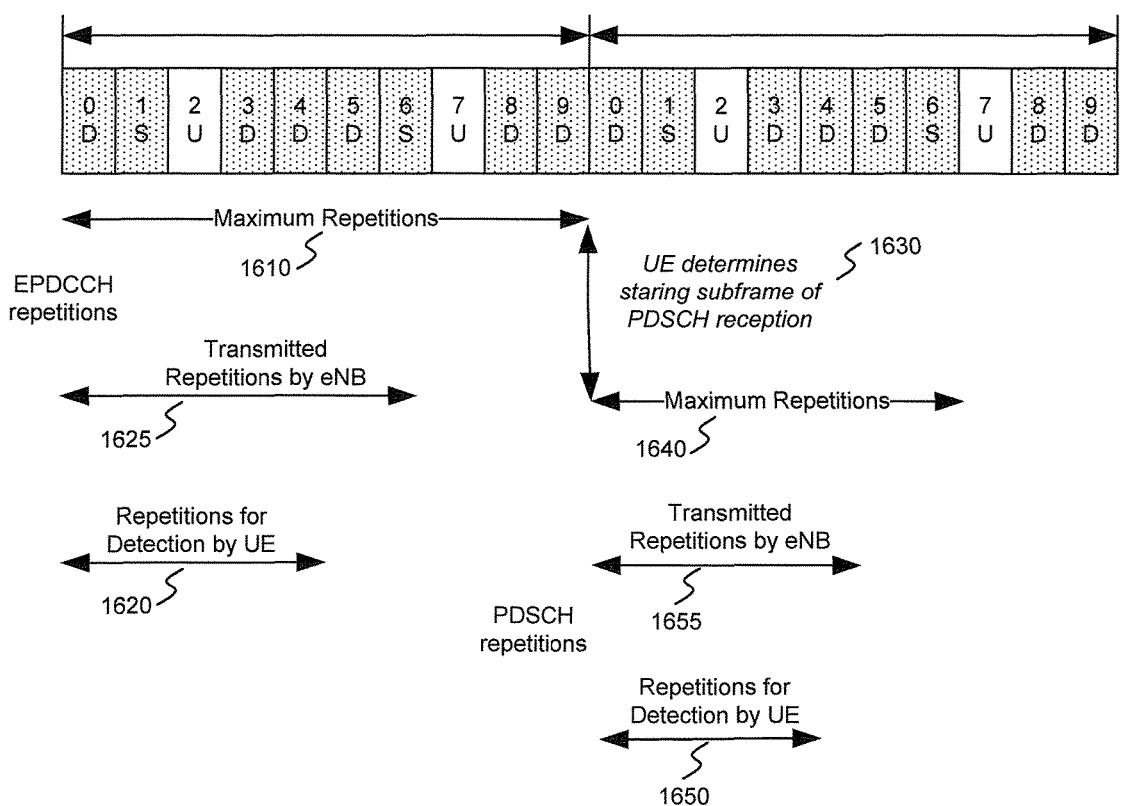
FIG. 16 illustrates an operation for a UE configured to receive a maximum number of repetitions for an EPDCCH transmission to determine a starting subframe for a PDSCH reception scheduled by a detected DCI format conveyed by the EPDCCH according to this disclosure.

FIG. 16 illustrates an operation for a UE configured to receive a maximum number of repetitions for an EPDCCH transmission to determine a starting subframe for a PDSCH reception scheduled by a detected DCI format conveyed by the EPDCCH. The embodiment shown in FIG. 16 is for illustration only. Other embodiments could be used without departing from the scope of the present disclosure.

A UE, such a UE 114, is configured by an eNB, such as eNB 102, to receive a maximum number of $N_C$ repetitions for an EPDCCH transmission 1610 and operates in a TDD system using TDD UL-DL configuration 2 (see also REF 1). A starting subframe for repetitions of an EPDCCH transmission is a first subframe in a frame. The UE monitors at least one EPDCCH candidate per DL subframe. The UE detects a valid DCI format scheduling a PDSCH after decoding first $N_{DC}$ repetitions for the EPDCCH transmission 1620 where $N_{DC} \leq N_C$. The eNB can also transmit repetitions of the EPDCCH transmission over a number of DL subframes $N_{TC}$ where $N_{TC} \leq N_C$ 1625. The UE (or the eNB) determines a starting DL subframe 1630 for PDSCH reception according to the maximum number of subframes corresponding to the maximum number of $N_C$ repetitions and not according to the number of $N_{DC}$ repetitions.

The eNB also configures the UE to receive a maximum number of $N_D$ repetitions for a PDSCH transmission 1640. The UE detects a data transport block conveying by the PDSCH after receiving $N_{DD}$ repetitions for the PDSCH transmission 1650 where $N_{DD} \leq N_D$. The eNB can also transmit the repetitions of the PDSCH transmission over a number of DL subframes $N_{TD}$ where $N_{TD} \leq N_D$ 1655. An HARQ-ACK signal transmission from the UE in response to the detection of the data transport block can be in an UL subframe determined from the value of $N_D$ similar to the procedure described in FIG. 15. The UE can also transition to an idle mode in subframes between the subframe where the UE receives the last of the $N_{DD}$ repetitions for the PDSCH transmission and the subframe where the UE transmits the first repetition for the HARQ-ACK signal transmission. Moreover, although FIG. 16 considers that the DCI format schedules a PDSCH reception by the UE, the same principle applies when the DCI format schedules a PUSCH transmission from the UE and then the UE can determine an UL subframe for a first repetition of the PUSCH transmission based on a last subframe from a maximum number of subframes corresponding to the configured number of $N_C$ repetitions for the EPDCCH transmission.

A disadvantage of Case 2 relative to Case 1 for the determination of a subframe for a UE, such as UE 114, to receive a first repetition of a PDSCH or to transmit a first repetition of a PUSCH is a reduced DL data rate or UL data rate, respectively. This is because even though an eNB, such as eNB 102, can use a smaller number of repetitions than a configured number of repetitions to transmit an EPDCCH for scheduling a PDSCH transmission to or a PUSCH transmission from the UE, this reduction in the number of repetitions cannot be used to increase a number of data transmissions to or from the UE over a time period as the UE cannot receive or transmit data in subframes between the subframe of the last repetition of the EPDCCH and the subframe corresponding to the configured number of EPDCCH repetitions. The same applies for the subframes after the subframe of the last repetition of a PDSCH transmission where the UE detects the data transport block and the subframe corresponding to the configured number of PDSCH repetitions in case a DCI format scheduling the PDSCH reception does not indicate the number of repetitions for the PDSCH transmission.

An advantage of Case 2 relative to Case 1 is that an (implicit or explicit) indication of a number of repetitions for an EDCCH or PDSCH transmission to the UE is not needed. The eNB does not need to predict, before the eNB starts transmitting repetitions for an EPDCCH or PDSCH transmission, a number of repetitions from a set of numbers of repetitions the eNB configures to the UE in advance by higher layer signaling. Instead, the eNB can have the flexibility, depending on transmission power availability in a given subframe, to transmit a repetition with higher or lower power and this can result to a smaller or larger number of repetitions (but not exceeding a configured number of repetitions) depending on actual power availability at the time of transmission of a repetition.

Although the present disclosure has been described with example embodiments, various changes and modifications may be suggested to one skilled in the art. It is intended that the present disclosure encompass such changes and modifications that fall within the scope of the appended claims.

What is claimed is:

1. A method, comprising:
   configuring, by a base station to a User Equipment (UE), a set of numbers of repetitions for downlink control channel transmission in respective set of numbers of subframes, wherein the downlink control channel conveys a downlink control information (DCI) format;
   mapping, by the base station, repetitions for a downlink control channel transmission according to a number of repetitions from the set of numbers for repetitions to resource elements over a same number of subframes; and
   transmitting, by the base station to the UE, the number of repetitions of the downlink control channel over the number of subframes.

2. The method of claim 1, wherein the DCI format schedules a transmission of a physical downlink shared channel (PDSCH) and the DCI format indicates a number of PDSCH repetitions.

3. The method of claim 1, wherein the configuration for the set of numbers of repetitions is determined from a configuration of a maximum number of repetitions in the set of numbers of repetitions and a predetermined association for the remaining numbers of repetitions in the set of numbers of repetitions.

4. The method of claim 1, wherein the base station transmits the repetitions according to a frequency hopping pattern and wherein at least two consecutive repetitions in respective at least two subframes are transmitted in same frequency resources.

5. The method of claim 1, wherein the DCI format includes a field indicating the number of repetitions.

6. The method of claim 1, wherein the DCI format schedules to the UE a reception of a physical downlink channel (PDSCH) or a transmission of a physical uplink shared channel (PUSCH), the UE detects the DCI format over a second number of repetitions that is smaller than the number of repetitions, and the UE determines a first subframe for the PDSCH reception or the PUSCH transmission, respectively, based on the number of repetitions.

7. The method of claim 6, wherein the DCI format schedules to the UE a reception of the PDSCH and the UE transmits an acknowledgement signal in response to a detection of a data transport block conveyed by the PDSCH only when the UE correctly detects the data transport block.

8. A User Equipment (UE), comprising:
a receiver configured to receive:
a configuration for a set of numbers of repetitions for a transmission of downlink control channel in respective set of numbers of subframes, wherein the downlink control channel conveys a downlink control information (DCI) format, and
a number of repetitions, from the set of numbers of repetitions, for a downlink control channel over a same number of subframes;
a demapper configured to, in response to the receiver receiving the repetitions, de-map the number of repetitions to resource elements over the number of subframes; and
a decoder configured to decode the DCI format.

9. The UE of claim 8, wherein until the UE successfully detects the DCI format, the UE decodes the DCI format only when the UE receives a number of repetitions from the set of numbers of repetitions.

10. The UE of claim 8, wherein the DCI format schedules a reception of a physical downlink shared channel (PDSCH) and the DCI format indicates a number of PDSCH repetitions.

11. The UE of claim 8, wherein the UE receives the repetitions according to a frequency hopping pattern and wherein at least two consecutive repetitions in respective at least two subframes are received in same frequency resources.

12. The UE of claim 8, wherein when the UE correctly decodes the DCI format, the UE determines the transmission of the downlink control channel to be according to a number of repetitions that is indicated by a field in the DCI format.

13. The UE of claim 12, wherein the DCI format schedules to the UE a reception of a physical downlink shared channel (PDSCH) or a transmission of a physical uplink shared channel (PUSCH), the UE detects the DCI format over a second number of repetitions that is smaller than the number of repetitions, and the UE determines a first subframe for the PDSCH reception or the PUSCH transmission, respectively, based on the number of repetitions.

14. The UE of claim 8, wherein the DCI format schedules to the UE a reception of a physical downlink shared channel (PDSCH) and the UE transmits an acknowledgement signal in response to a detection of a data transport block conveyed by the PDSCH only when the UE correctly detects the data transport block.

15. The UE of claim 8, wherein the UE determines the configuration for the set of numbers of repetitions from a configuration of a maximum number of repetitions in the set of numbers of repetitions and a predetermined association for the remaining numbers of repetitions in the set of numbers of repetitions.

16. A base station, comprising:
a transmitter configured to transmit to a User Equipment (UE):
a configuration for a set of numbers of repetitions for a downlink control channel transmission in respective set of numbers of subframes, wherein the downlink control channel conveys a Downlink Control Information (DCI) format, and
a number of repetitions, from the set of numbers of repetitions, for a downlink control channel transmission over a same number of subframes; and
a mapper configured to map the number of repetitions to resource elements over the number of subframes.

17. The base station of claim 16, wherein the DCI format schedules a transmission of a physical downlink shared channel (PDSCH) and the DCI format indicates a number of PDSCH repetitions.

18. The base station of claim 16, wherein the base station transmits the repetitions according to a frequency hopping pattern and wherein at least two consecutive repetitions in respective at least two subframes are transmitted in same frequency resources.

19. The base station of claim 16, wherein the DCI format includes a field indicating the number of repetitions.

20. The base station of claim 19, wherein the DCI format schedules to the UE a reception of a physical downlink shared channel (PDSCH) or a transmission of a physical uplink shared channel (PUSCH), the UE detects the DCI format over a second number of repetitions that is smaller than the number of repetitions, and the UE determines a first subframe for the PDSCH reception or the PUSCH transmission, respectively, based on the number of repetitions.

* * * * *